United States Patent
Kokaki

(10) Patent No.: US 11,247,682 B2
(45) Date of Patent: Feb. 15, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventor: Toru Kokaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 234 days.

(21) Appl. No.: 16/488,953

(22) PCT Filed: Mar. 1, 2017

(86) PCT No.: PCT/JP2017/008080
§ 371 (c)(1),
(2) Date: Aug. 27, 2019

(87) PCT Pub. No.: WO2018/158875
PCT Pub. Date: Sep. 7, 2018

(65) Prior Publication Data
US 2020/0010088 A1    Jan. 9, 2020

(51) Int. Cl.
*B60W 30/18*    (2012.01)
*B60W 10/18*    (2012.01)
(Continued)

(52) U.S. Cl.
CPC ...... *B60W 30/18163* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS 9,092,987 B2 *   7/2015   Bone ................. G08G 1/167
2006/0047409 A1  3/2006   Oka
(Continued)

FOREIGN PATENT DOCUMENTS

JP   2003-288691   10/2003
JP   2006-069343    3/2006
(Continued)

OTHER PUBLICATIONS

International Search Report and Written Opinion for International Application Serial No. PCT/JP2017/008080 dated Jun. 6, 2017, 10 pages.

*Primary Examiner* — Navid Ziaeianmehdizadeh
(74) *Attorney, Agent, or Firm* — Amin, Turocy & Watson, LLP

(57) ABSTRACT

A vehicle control system includes: a recognizer that is configured to recognize one or more surrounding vehicles present in a second lane different from a first lane in which a subject vehicle is present; an identifier that is configured to derive an index value according to a cutting-in probability for a side in front of the subject vehicle for a surrounding vehicle recognized by the recognizer and is configured to identify a surrounding vehicle of which the derived index value is equal to or larger than a threshold as a cutting-in vehicle; and a running controller that is configured to decelerate the subject vehicle in accordance with presence of the cutting-in vehicle identified by the identifier and is configured to determine a degree of change in deceleration of the subject vehicle on the basis of the index value of the cutting-in vehicle that is a target when the subject vehicle is decelerated.

9 Claims, 18 Drawing Sheets

(51) Int. Cl.
  *B60W 10/20* (2006.01)
  *G06K 9/00* (2006.01)
(52) U.S. Cl.
  CPC ..... *G06K 9/00805* (2013.01); *B60W 2554/80* (2020.02); *B60W 2720/10* (2013.01)

(56) References Cited

U.S. PATENT DOCUMENTS

| | | | |
|---|---|---|---|
| 2013/0226433 A1 | 8/2013 | Tominaga et al. | |
| 2017/0088136 A1* | 3/2017 | Seo | B60W 30/16 |
| 2018/0178796 A1* | 6/2018 | Fukuda | B60W 30/16 |

FOREIGN PATENT DOCUMENTS

| | | |
|---|---|---|
| JP | 2010-158924 | 7/2010 |
| JP | 2013-177054 | 9/2013 |
| JP | 2014-041434 | 3/2014 |
| JP | 2015-225546 | 12/2015 |

\* cited by examiner

152

| CANDIDATE FOR FIRST INDEX VALUE \ TTC OF VEHICLE | M, m1 | M, m3 | m1, m3 | m2, m3 |
|---|---|---|---|---|
| α1 | 0.0–1.0 | 0.0–0.5 | 0.0–1.0 | 0.0–1.0 |
| α2 | 0.0–1.0 | 0.5–1.0 | 0.0–1.0 | 0.0–1.0 |
| α3 | 0.0–1.0 | 1.0–1.5 | 0.0–1.0 | 0.0–1.0 |
| ⋮ | ⋮ | ⋮ | ⋮ | ⋮ |
| αn | N OR MORE | N OR MORE | N OR MORE | N OR MORE |

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

Conventionally, a technology for predicting whether a surrounding vehicle will cut in front of a subject vehicle is known (for example, Patent Document 1).

PRIOR ART DOCUMENTS

Patent Documents

[Patent Document 1]
Japanese Unexamined Patent Application, First Publication No. 2003-288691

SUMMARY OF INVENTION

Problems to be Solved by the Invention

However, in a conventional technology, there are cases in which a subject vehicle is excessively decelerated with respect to a surrounding vehicle which is predicted to cut in. The present invention is realized in consideration of such a situation, and one objective thereof is to provide a vehicle control system, a vehicle control method, and a vehicle control program capable of performing appropriate speed control in accordance with cutting-in of a surrounding vehicle.

Solution to Problem

A first aspect of the invention is a vehicle control system including: a recognizer that is configured to recognize one or more surrounding vehicles present in a second lane different from a first lane in which a subject vehicle is present; an identifier that is configured to derive an index value according to a cutting-in probability for a side in front of the subject vehicle for a surrounding vehicle recognized by the recognizer and is configured to identify a surrounding vehicle of which the derived index value is equal to or larger than a threshold as a cutting-in vehicle; and a running controller that is configured to decelerate the subject vehicle in accordance with presence of the cutting-in vehicle identified by the identifier and is configured to determine a degree of change in deceleration of the subject vehicle on the basis of the index value of the cutting-in vehicle that is a target when the subject vehicle is decelerated.

In a second aspect of the invention, in a vehicle control system of the first aspect, the identifier is configured to derive the index value on the basis of a distance between each of the surrounding vehicles recognized by the recognizer and a partition line partitioning the first lane and the second lane from each other.

In a third aspect of the invention, in a vehicle control system of the first or second aspect, the running controller further is configured to determine the degree of change in the deceleration of the subject vehicle on the basis of a relative relation between each of the surrounding vehicles recognized by the recognizer and the subject vehicle.

In a fourth aspect of the invention, in a vehicle control system of any one of the first to third aspects, in a case in which a point at which a lane change from the second lane to the first lane is required is present in front of the subject vehicle when referring to map information, the identifier is configured to derive a larger index value as the surrounding vehicle becomes closer to the point.

In a fifth aspect of the invention, in a vehicle control system of any one of the first to fourth aspects, in a case in which a plurality of surrounding vehicles are recognized by the recognizer, the identifier is configured to identify a surrounding vehicle of which the index value is the largest among the plurality of surrounding vehicles as the cutting-in vehicle.

In a sixth aspect of the invention, in a vehicle control system according to any one of the first to fifth aspects, the running controller is configured to increase the degree of change in the deceleration of the subject vehicle in accordance with an increase in the index value and decrease the degree of change in the deceleration of the subject vehicle in accordance with a decrease in the index value.

In a seventh aspect of the invention, in a vehicle control system of any one of the first to sixth aspects, the identifier repeatedly is configured to perform a process of deriving the index value for each of the surrounding vehicles at predetermined time intervals, and the running controller is configured to increase the degree of change in the deceleration of the subject vehicle in a case in which the same cutting-in vehicle is consecutively identified in the process in which the index value is repeatedly derived by the identifier.

An eighth aspect of the invention is a vehicle control method using an in-vehicle computer, the vehicle control method including: recognizing one or more surrounding vehicles present in a second lane different from a first lane in which a subject vehicle is present; deriving an index value according to a cutting-in probability for a side in front of the subject vehicle for a recognized surrounding vehicle; identifying a surrounding vehicle of which the derived index value is equal to or larger than a threshold as a cutting-in vehicle; decelerating the subject vehicle in accordance with presence of the identified cutting-in vehicle; and determining a degree of change in deceleration of the subject vehicle on the basis of the index value of the cutting-in vehicle that is a target when the subject vehicle is decelerated.

A ninth aspect of the invention is a non-transitory computer-readable storage medium storing a vehicle control program causing an in-vehicle computer to execute: a recognizing one or more surrounding vehicles present in a second lane different from a first lane in which a subject vehicle is present; deriving an index value according to a cutting-in probability for a side in front of the subject vehicle for a recognized surrounding vehicle; identifying a surrounding vehicle of which the derived index value is equal to or larger than a threshold as a cutting-in vehicle; decelerating the subject vehicle in accordance with presence of the identified cutting-in vehicle; and determining a degree of change in deceleration of the subject vehicle on the basis of the index value of the cutting-in vehicle that is a target when the subject vehicle is decelerated.

Advantageous Effects of Invention

According to the invention of each claim, a surrounding vehicle of which a derived index value according to a cutting-in probability for a side in front of a subject vehicle is equal to or larger than a threshold is identified as a cutting-in vehicle, and a degree of change in deceleration of the subject vehicle is determined on the basis of the index value of the cutting-in vehicle that is a target when the subject vehicle is decelerated in accordance with presence of the cutting-in vehicle, and accordingly, appropriate speed control can be performed in accordance with cutting-in of the surrounding vehicle.

DESCRIPTION OF EMBODIMENTS

Hereinafter, a vehicle control system, a vehicle control method, and a vehicle control program according to embodiments of the present invention will be described with reference to the drawings.

First Embodiment

Figure 1:
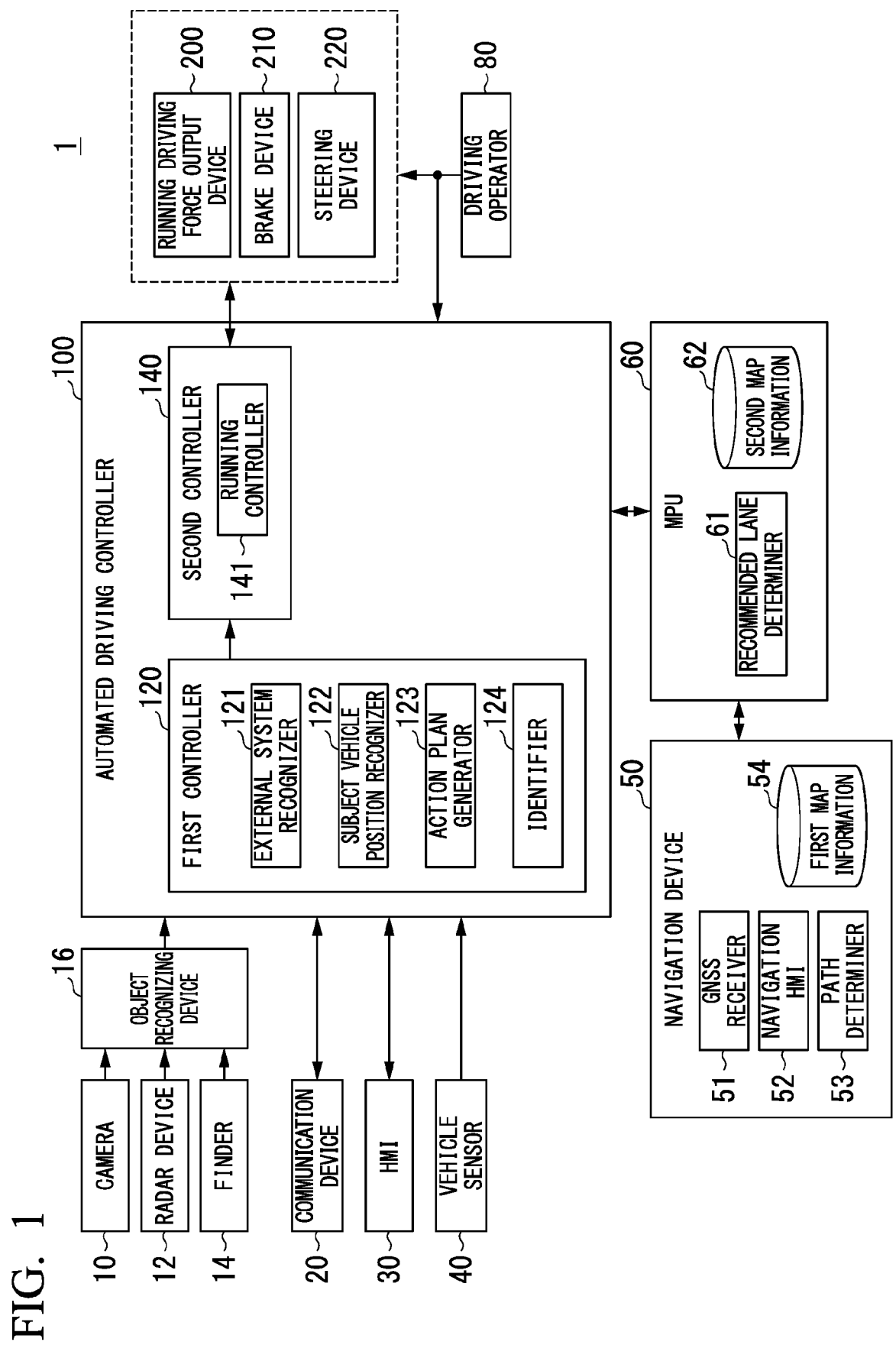
FIG. 1 is a configuration diagram of a vehicle control system 1 according to a first embodiment.

FIG. 1 is a configuration diagram of a vehicle control system 1 according to a first embodiment. A vehicle in which the vehicle control system 1 is mounted is, for example, a vehicle having two wheels, three wheels, four wheels, or the like, and a driving source thereof is an internal combustion engine such as a diesel engine or a gasoline engine, an electric motor, or a combination thereof. An electric motor operates using power generated using a power generator connected to an internal combustion engine or discharge power of a secondary cell or a fuel cell.

The vehicle control system 1, for example, includes a camera 10, a radar device 12, a finder 14, an object recognizing device 16, a communication device 20, a human machine interface (HMI) 30, a vehicle sensor 40, a navigation device 50, a micro-processing unit (MPU) 60, a driving operator 80, an automated driving controller 100, a running driving force output device 200, a brake device 210, and a steering device 220. Such devices and units are interconnected using a multiplex communication line such as a controller area network (CAN) communication line, a serial communication line, a radio communication network, or the like. In addition, the configuration shown in FIG. 1 is merely one example, and thus, some components may be omitted, and, furthermore, another component may be added thereto.

The camera 10, for example, is a digital camera using a solid-state imaging device such as a charge coupled device (CCD) or a complementary metal oxide semiconductor (CMOS). One or a plurality of cameras 10 are installed at arbitrary places in a vehicle (hereinafter, referred to as a subject vehicle M) in which the vehicle control system 1 is mounted. In a case in which the side in front of the subject vehicle M is to be imaged, the camera 10 is installed at an upper part of a front windshield, a rear face of a rear-view mirror, or the like. The camera 10, for example, repeatedly images the vicinity of the subject vehicle M periodically. The camera 10 may be a stereo camera.

The radar device 12 emits radiowaves such as millimeter waves to the vicinity of the subject vehicle M and detects at least a position (a distance and an azimuth) of an object by detecting radiowaves (reflected waves) reflected by the object. One or a plurality of radar devices 12 are installed at arbitrary places in the subject vehicle M. The radar device 12 may detect a position and a speed of an object using a frequency modulated continuous wave (FMCW) system.

The finder 14 is a light detection and ranging or a laser imaging detection and ranging (LIDAR) finder that detects a distance to a target by measuring light scattered from emitted light. One or a plurality of finders 14 are installed at arbitrary places in the subject vehicle M.

The object recognizing device 16 may perform a sensor fusion process on results of detection using some or all of the camera 10, the radar device 12, and the finder 14, thereby recognizing a position, a type, a speed, and the like of an object. The object recognizing device 16 provides a result of recognition to the automated driving controller 100.

The communication device 20, for example, communicates with vehicles present in the vicinity of the subject vehicle M using a cellular network, a Wi-Fi network, Bluetooth (registered trademark), dedicated short range communication (DSRC), or the like or communicates with various server apparatuses through a radio base station.

The HMI 30 presents various types of information to a vehicle occupant of the subject vehicle M and receives an input operation performed by a vehicle occupant. For example, the HMI 30 includes a display device 31 and an operation accepter 32.

The display device 31, for example, is a liquid crystal display (LCD), an organic electroluminescence (EL) display, or the like and is mounted at each part of an instrument panel or an arbitrary point in an assistant driver's seat or a rear seat. In addition, the display device 31 may be a touch panel integrated with the operation accepter 32 to be described later.

The operation accepter 32, for example, accepts an operation for an instruction of a lane change as one of operations input by a vehicle occupant. For example, the operation accepter 32 is a switch, an input key, or the like. The operation accepter 32 generates an operation input signal according to an accepted input operation and outputs the signal to the automated driving controller 100.

The vehicle sensor 40 includes a vehicle speed sensor detecting a speed of the subject vehicle M, an acceleration sensor detecting an acceleration, a yaw rate sensor detecting an angular velocity around a vertical axis, an azimuth sensor detecting a direction of the subject vehicle M, and the like. The vehicle sensor 40 outputs detected information (a speed, an acceleration, an angular velocity, an azimuth, and the like) to the automated driving controller 100.

The navigation device 50, for example, includes a global navigation satellite system (GNSS) receiver 51, a navigation HMI 52, and a path determiner 53 and stores first map information 54 in a storage device such as a hard disk drive (HDD) or a flash memory.

The GNSS receiver 51 identifies a position of a subject vehicle M on the basis of signals received from GNSS satellites. The position of the subject vehicle M may be identified or complemented by an inertial navigation system (INS) using an output of the vehicle sensor 40.

The navigation HMI 52 includes a display device, a speaker, a touch panel, an input key, and the like. A part or the whole of the navigation HMI 52 and the HMI 30 described above may be configured to be shared.

The path determiner 53, for example, a path from a location of the subject vehicle M identified by the GNSS receiver 51 (or an input arbitrary location) to a destination input by a vehicle occupant using the navigation HMI 52 by referring to the first map information 54. The first map information 54, for example, is information in which a road form is represented by respective links representing a road and respective nodes connected using the links. The first map information 54 may include a curvature of each road, point of interest (POI) information, and the like. The path determined by the path determiner 53 is output to the MPU 60.

In addition, the navigation device 50 may perform path guidance using the navigation HMI 52 on the basis of the path determined by the path determiner 53. Furthermore, the navigation device 50, for example, may be realized by a function of a terminal device such as a smartphone or a tablet terminal held by a user. In addition, the navigation device 50 may transmit a current location and a destination to a navigation server through the communication device 20 and acquire a path received from the navigation server as a reply.

The MPU 60, for example, functions as a recommended lane determiner 61 and maintains second map information 62 in a storage device such as an HDD or a flash memory. The recommended lane determiner 61 divides a path provided from the navigation device 50 into a plurality of blocks (for example, divides the path into blocks of 100 [m] in the advancement direction of the vehicle) and determines a recommended lane in which the subject vehicle M will run for each block by referring to the second map information 62.

For example, in a case in which a path provided from the navigation device 50 has a plurality of lanes, the recommended lane determiner 61 determines, for each block, one lane among one or more lanes included in the blocks as a recommended lane. In a case in which there is a branching point, a merging point, or the like in the provided path, the recommended lane determiner 61 determines a recommended lane such that the subject vehicle M runs along a reasonable running path for advancement to a destination at the point. For example, in a case in which a destination is present on an extending line of a lane branching from a main line including a plurality of lanes, the recommended lane determiner 61 determines a lane directed toward a lane (branching lane) of a branching destination among lanes included in the main lane as a recommended lane.

The second map information 62 is map information having an accuracy higher than that of the first map information 54. The second map information 62, for example, includes information of the center of respective lanes, information on boundaries between lanes, or the like. In addition, in the second map information 62, road information, traffic regulations information, address information (address and zip code), facilities information, telephone information, and the like may be included. In the road information, information representing a type of road such as an expressway, a toll road, a national road, or a prefectural road and information such as the number of lanes of a road, a width of each lane, a gradient of a road, a position of a road (three-dimensional coordinates including longitude, latitude, and a height), a curvature of the curve of a lane, locations of merging and branching points of lanes, a sign installed on a road, and the like are included. The second map information 62 may be updated as is necessary by accessing another device using the communication device 20.

The driving operator 80, for example, includes an acceleration pedal, a brake pedal, a shift lever, a steering wheel, and the like. For example, the steering wheel may accept an operation for instructing a lane change performed for the operation accepter 32. A sensor detecting the amount of an operation or the presence/absence of an operation is installed in the driving operator 80, and a result of detection thereof is output to the automated driving controller 100 or the running driving force output device 200 or one or both of the brake device 210 and the steering device 220.

The automated driving controller 100, for example, includes a first controller 120 and a second controller 140. Each of the first controller 120 and the second controller 140 is realized by a processor such as a central processing unit (CPU) executing a program (software). Some or all of the constituent elements of the first controller 120 and the second controller 140 may be realized by hardware such as a large scale integration (LSI), an application specific integrated circuit (ASIC), a field-programmable gate array (FPGA), or the like or may be realized by cooperation between software and hardware.

The first controller 120, for example, includes an external system recognizer 121, a subject vehicle position recognizer 122, an action plan generator 123, and an identifier 124.

The external system recognizer 121 recognizes states of surrounding vehicles such as positions, speeds, and accelerations on the basis of information input from the camera 10, the radar device 12, and the finder 14 through the object recognizing device 16. A surrounding vehicle, for example, is a vehicle running in the vicinity of the subject vehicle M and is a vehicle running in the same direction as the advancement direction of the subject vehicle M.

For example, the external system recognizer 121 may recognize a relative position of a surrounding vehicle with respect to a partition line partitioning a lane in which the surrounding vehicle is present or recognize a speed in the advancement direction of a surrounding vehicle or a speed in a lane width direction that is orthogonal to the advancement direction and is approximately parallel to the road surface on which the subject vehicle is running The position of a surrounding vehicle may be represented as a representative point of the surrounding vehicle such as the center or gravity, a corner, or the like and may be represented by an area represented by the contour of the surrounding vehicle. The "state" of a surrounding vehicle may include an acceleration or a jerk or is "action state" (for example, the vehicle is changing lanes or is to change lanes) of the surrounding vehicle. In addition, the external system recognizer 142 may recognize positions of a fallen object fallen onto a vehicle road and a guard rail, a telegraph pole, a parked vehicle, a pedestrian, display of a road surface, marks, and other objects in addition to the surrounding vehicles.

The subject vehicle position recognizer 122, for example, recognizes a lane (own lane) in which the subject vehicle M runs and a relative position and a posture of the subject vehicle M with respect to the own lane. The subject vehicle position recognizer 122, for example, by comparing a pattern (for example, an array of a solid line and a broken line) of a road partition line that is acquired from the second map information 62 with a pattern of the road partition line in the vicinity of the subject vehicle M that is recognized from an image captured by the camera 10, recognizes an own lane. In the recognition, the position of the subject vehicle M acquired from the navigation device 50 and a processing result acquired using the INS may be added.

Figure 2:
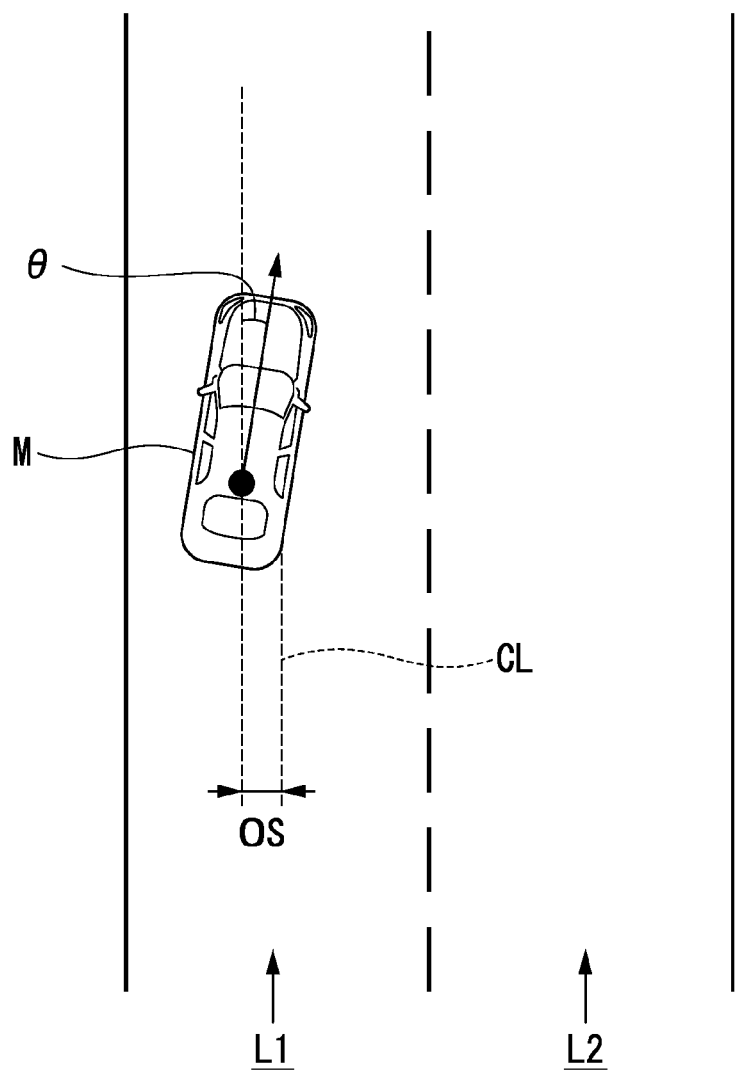
FIG. 2 is a diagram showing a situation in which a relative position and a posture of a subject vehicle M with respect to an own lane L1 are recognized by a subject vehicle position recognizer 122.

Then, the subject vehicle position recognizer 122, for example, recognizes a position and a posture of the subject vehicle M with respect to the own lane. FIG. 2 is a diagram showing a situation in which a relative position and a posture of a subject vehicle M with respect to an own lane L1 are recognized by the subject vehicle position recognizer 122. The subject vehicle position recognizer 122, for example, recognizes an offset OS of a reference point (for example, center of gravity) of the subject vehicle M from the own lane center CL and an angle θ of an advancement direction of the subject vehicle M formed with respect to a line acquired by aligning the own lane center CL as a relative position and a posture of the subject vehicle M with respect to the own lane L1. In addition, instead of this, the subject vehicle position recognizer 122 may recognize a position of the reference point of the subject vehicle M with respect to one side end of an own lane L1 or the like as a relative position of the subject vehicle M with respect to the own lane. The relative position of the subject vehicle M recognized by the subject vehicle position recognizer 122 is provided for the action plan generator 123.

The action plan generator 123 generates an action plan such that the subject vehicle runs in a lane determined as a recommended lane by the recommended lane determiner 61 and responds to a surrounding status of the subject vehicle M. The action plan is configured by events that are sequentially executed in automated driving. The automated driving represents that at least one or both of acceleration/deceleration and steering of the subject vehicle M is controlled by the automated driving controller 100.

In the events, for example, there are a constant-speed running event in which the subject vehicle runs at a constant speed in the same running lane, a following running event in which the subject vehicle follows a preceding vehicle, a lane changing event in which a running lane is changed, an overtaking event in which the subject vehicle M is caused to overtake a preceding vehicle, and the like. The overtaking event, for example, is planned under a situation in which the speed of a preceding vehicle is lower than the speed of the subject vehicle M by a predetermined speed or more, and an average speed or the like of surrounding vehicles running in an adjacent lane that is adjacent to the own lane is higher than the speed of the subject vehicle M by a predetermined speed or more. For example, in a case in which the overtaking event is executed, the subject vehicle M moves to an adjacent lane through a lane change once and moves to a side in front of a preceding vehicle in accordance with an acceleration or the like and an own lane (original lane) before the lane change through a lane change.

In addition, in the events, a merging event in which the running lane is changed to a merging lane by accelerating/decelerating the subject vehicle M in the merging lane used for merging into a main line, a branching event in which the lane of the subject vehicle M is changed to a lane of a branching destination at a branching point, an emergency stop event in which the subject vehicle M is emergently stopped in accordance with behaviors of surrounding vehicles and the like, a switching event (a take-over event) for ending an automated driving mode and switching to a manual driving, and the like may be included. Manual driving represents that the running driving force output device 200, the brake device 210, and the steering device 220 are controlled in accordance with an operation of a vehicle occupant on the driving operator 80. In addition, during the execution of such an event, an avoiding event for avoiding an obstacle or the like may be planned on the basis of the surrounding situations of the subject vehicle M (obstacles on a vehicle road, surrounding vehicles, presence of pedestrians, lane constriction due to a road construction, and the like).

The action plan generator 123 generates a target locus along which the subject vehicle M will run in the future. The target locus is represented by sequentially aligning points (locus points) at which the subject vehicle M will arrive. A locus point is a point at which the subject vehicle M will arrive for every predetermined running distance, and, separated from that, a target speed and a target acceleration for every predetermined sampling time (for example, a fraction of [sec]) are generated as a part of the target locus. In addition, a locus point may be a position at which the subject vehicle M will arrive at a sampling time for every predetermined sampling time. In this case, information of a target speed and a target acceleration is represented at the interval of locus points.

Figure 3:
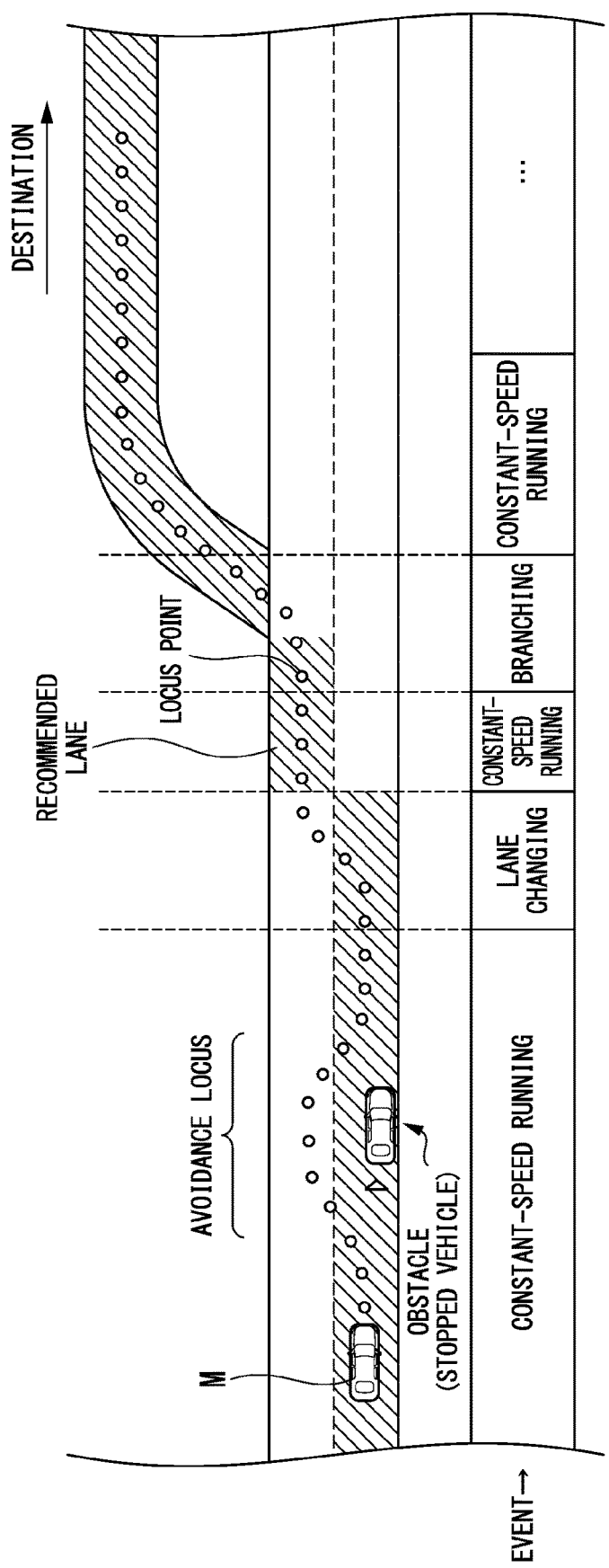
FIG. 3 is a diagram showing a situation in which a target locus is generated on the basis of a recommended lane.

FIG. 3 is a diagram showing a situation in which a target locus is generated on the basis of a recommended lane. As shown in the drawing, the recommended lane is determined such that it is convenient for the subject vehicle to run along a path to a destination. When the subject vehicle reaches a position before a predetermined distance from a recommended lane switching point, the action plan generator 123 starts the lane changing event, the branching event, the merging event, or the like. In a case in which there is a need for avoiding an obstacle during the execution (operation) of each event, the action plan generator 123, as shown in the drawing, may generate a locus for avoiding the obstacle by temporarily changing the lane of the subject vehicle M to an adjacent lane or may generate a locus for decelerating the subject vehicle M such that the subject vehicle M stops in front of the obstacle.

The action plan generator 123, for example, generates a plurality of candidates for a target locus and selects a target locus that is optimal at that time point on the basis of points of view of safety and efficiency. Then, the action plan generator 123 provides the selected target locus for the running controller 141.

The identifier 124 identifies a surrounding vehicle having a high likelihood of cutting in front of the subject vehicle M among surrounding vehicles recognized by the external system recognizer 121 (hereinafter, referred to as a cutting-in vehicle). In other words, the identifier 124 identifies a surrounding vehicle having a high likelihood of changing the lane to the own lane on a side in front of the subject vehicle M among surrounding vehicles present in a lane different from the own lane in which the subject vehicle M is present as a cutting-in vehicle.

Figure 4:
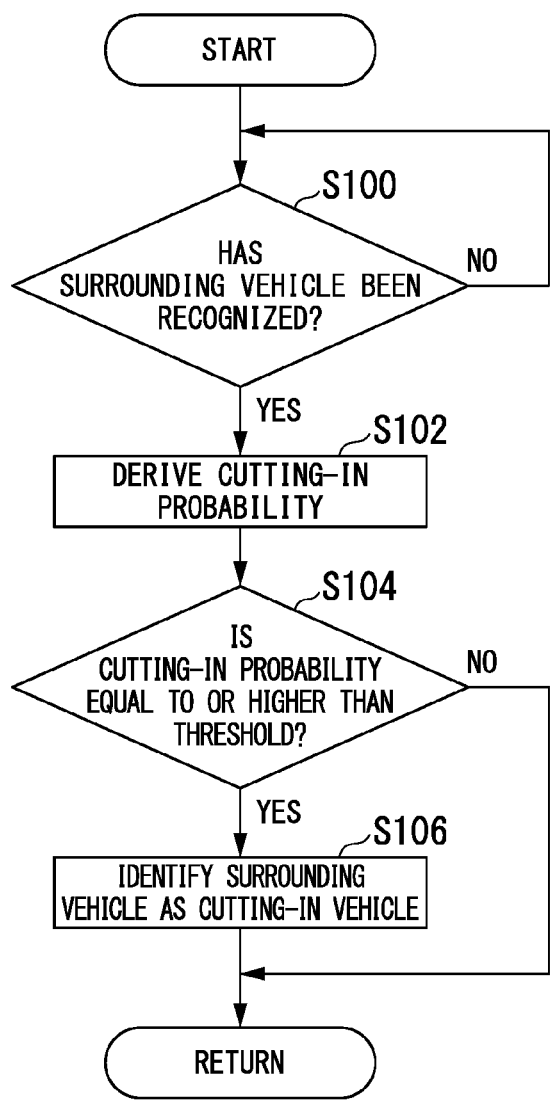
FIG. 4 is a flowchart showing one example of a process executed by an identifier 124.

FIG. 4 is a flowchart showing one example of a process executed by the identifier 124. The process of this flowchart, for example, may be repeatedly performed at predetermined time intervals.

First, the identifier 124 waits until surrounding vehicles are recognized by the external system recognizer 121 (Step S100). Then, when surrounding vehicles are recognized by the external system recognizer 121, the identifier 124 derives a cutting-in probability P that is acquired by quantifying the likelihood of a surrounding vehicle cutting in front of the subject vehicle M for each surrounding vehicle (Step S102).

Figure 5:
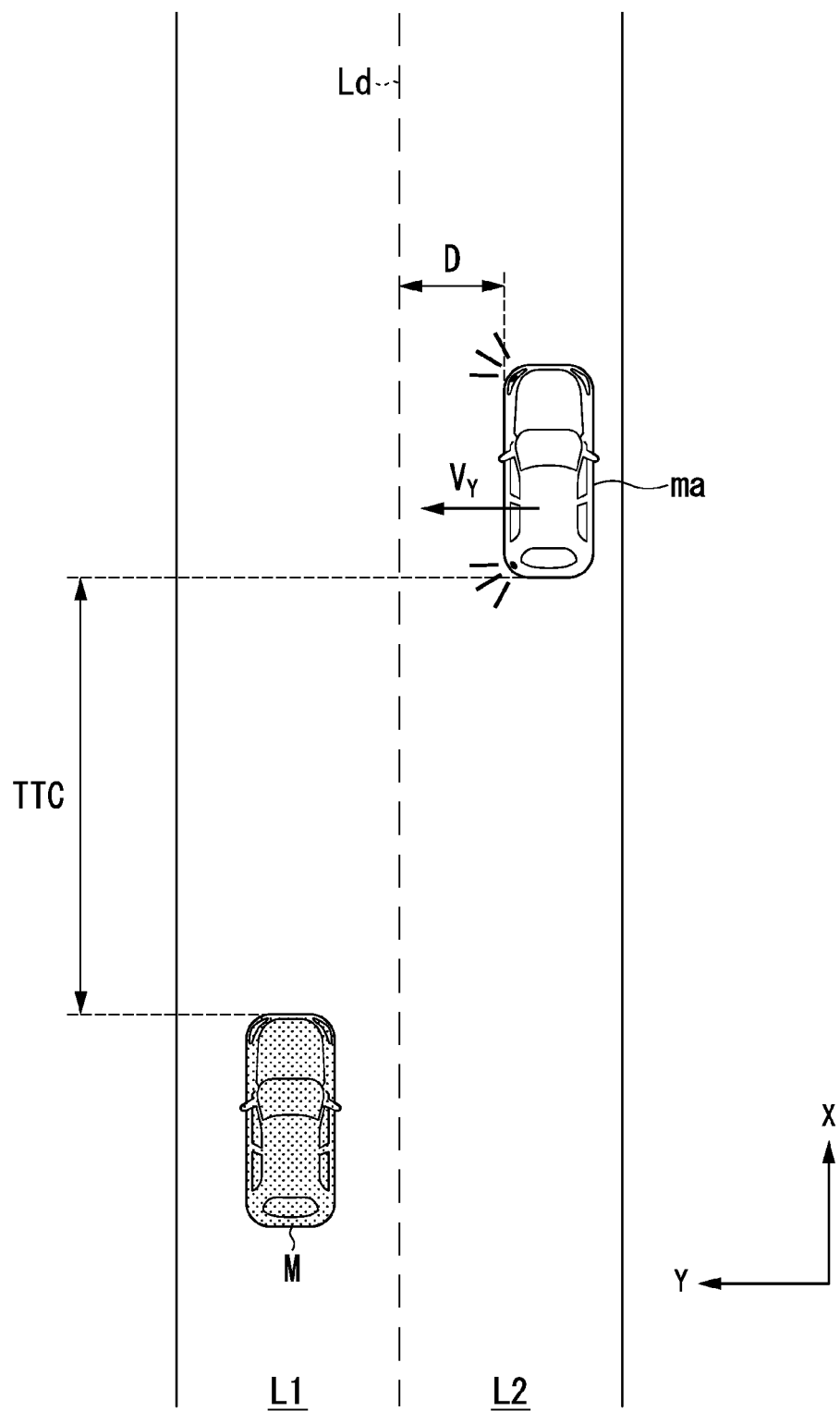
FIG. 5 is a diagram showing a method of deriving a cutting-in probability P.

FIG. 5 is a diagram showing a method of deriving a cutting-in probability P. In the drawing, ma represents a surrounding vehicle, and X and Y respectively show a lane extending direction (vehicle advancement direction) and a lane width direction. For example, the identifier 124 may derive a cutting-in probability P using some or all of a parameter L representing presence/absence of lighting of a turn-signal lamp as "1" or "0," a distance D from a partition line Ld on a side close to an own lane L1 among partition lines partitioning a lane L2 in which a surrounding vehicle is present to the surrounding vehicle, a speed $V_Y$ of a surrounding vehicle in a lane-width direction Y of a surrounding vehicle (hereinafter, referred to as a lateral velocity $V_Y$), and a time-to-collision (TTC) between the subject vehicle M and a surrounding vehicle. In a case in which it is assumed that a current relative speed between the subject vehicle M and a surrounding vehicle is maintained, the time-to-collision TTC is a time from the current time to a time when it is estimated that a vehicle head part (front end) of the subject vehicle M will be brought into contact with a vehicle end part (rear end) of the surrounding vehicle and may be acquired as a value obtained by dividing an inter-vehicle distance between the subject vehicle M and the surrounding vehicle by the relative speed of such vehicles. For example, the lateral velocity $V_Y$ may be acquired by dividing a distance moved by a surrounding vehicle in a lane-width direction until a certain observation time elapses with a direction of approach to the own lane set as positive by the observation time.

For example, the identifier 124 derives a cutting-in probability P on the basis of the following numerical expression (1) in consideration of all of the parameter L, the distance D, the lateral velocity VY, and the time-to-collision TTC.

[Expression. 1]

$$P=(w_1 \times L)+(w_2 \times (1-D))+(w_3 \times V_Y)+(w_4 \times TTC) \quad (1)$$

In the expression, $w_1$ is a weighting factor for the parameter L, $w_2$ is a weighting factor for the distance D, $w_3$ is a weighting factor for the lateral velocity $V_Y$, and $w_4$ is a weighting factor for the time-to-collision TTC. A ratio between respective weighting factors is determined such that a sum of the weighting factors $w_1$ to $w_4$ becomes "1." In addition, each parameter is normalized (standardized) such that a maximum value thereof becomes "1." For example, the distance D may be normalized by being divided by an assumed maximum distance (for example, the entire width of a lane), the lateral velocity $V_Y$ may be normalized by being divided by a maximum speed that can be output in the lane-width direction Y by a vehicle, and the time-to-collision TTC, for example, may be normalized by being divided by a time-to-collision TTC derived when a surrounding vehicle is detected near a limit of a detection range of the camera 10 and the finder 14.

Next, the identifier 124 determines whether or not a derived cutting-in probability P is equal to or higher than a threshold (for example, about 0.5) for each surrounding vehicle (Step S104). In a case in which there is a surrounding vehicle of which a derived cutting-in probability P is equal to or higher than a threshold, the identifier 124 identifies the surrounding vehicle as a cutting-in vehicle (a surrounding vehicle having a high likelihood of cutting in front of the subject vehicle M) (Step S106). In this way, the process of this flowchart ends.

In addition, in a case in which a result of the process of S104 is that there are a plurality of surrounding vehicles of which cutting-in probabilities P are equal to or higher than a threshold, the identifier 124 may identify a surrounding vehicle of which a cutting-in probability P is the highest as a cutting-in vehicle.

Figure 6:
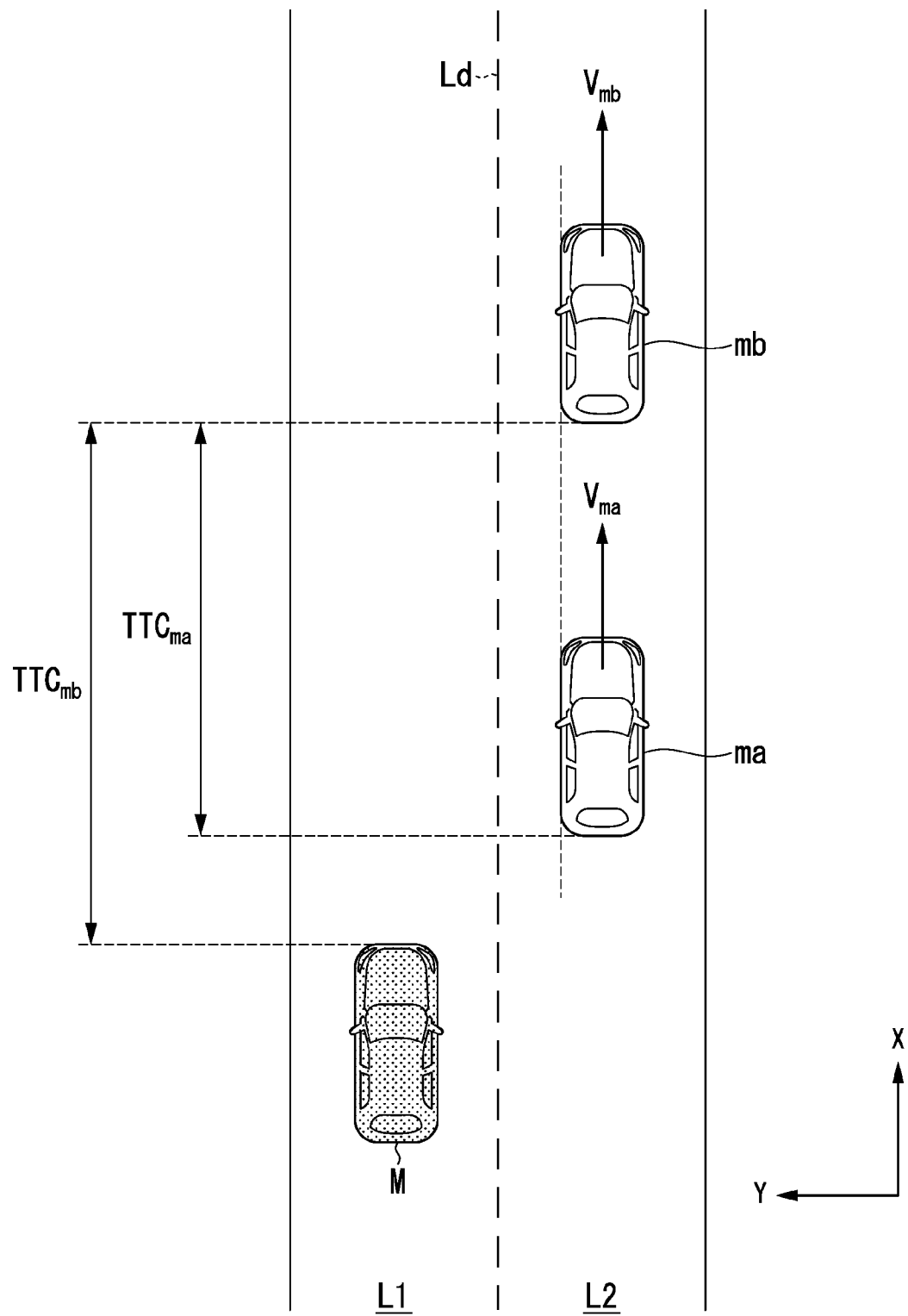
FIG. 6 is a diagram showing one example of a situation in which a plurality of surrounding vehicles are present in the vicinity of a subject vehicle M.

FIG. 6 is a diagram showing one example of a situation in which a plurality of surrounding vehicles are present in the vicinity of a subject vehicle M. In the drawing, ma and mb represent surrounding vehicles, $V_{ma}$ represents a speed of the surrounding vehicle ma, and $V_{mb}$ represents a speed of the surrounding vehicle mb. In the example shown in the drawing, the surrounding vehicle ma is located closer to the subject vehicle M than the surrounding vehicle mb, and the speed $V_{ma}$ of the surrounding vehicle ma is the same as the speed $V_{mb}$ of the surrounding vehicle mb. In addition, distances from a partition line Ld to the surrounding vehicles are the same. In the case shown of the example shown in the drawing, since the surrounding vehicle mb is farther from the subject vehicle M than the surrounding vehicle ma, a time-to-collision $TTC_{mb}$ between the subject vehicle M and the surrounding vehicle mb is longer than a time-to-collision $TTC_{ma}$ between the subject vehicle M and the surrounding vehicle ma. In this case, a cutting-in probability P of the surrounding vehicle mb is higher than a cutting-in probability P of the surrounding vehicle ma. Accordingly, the identifier 124 identifies the surrounding vehicle mb as a cutting-in vehicle.

Figure 7:
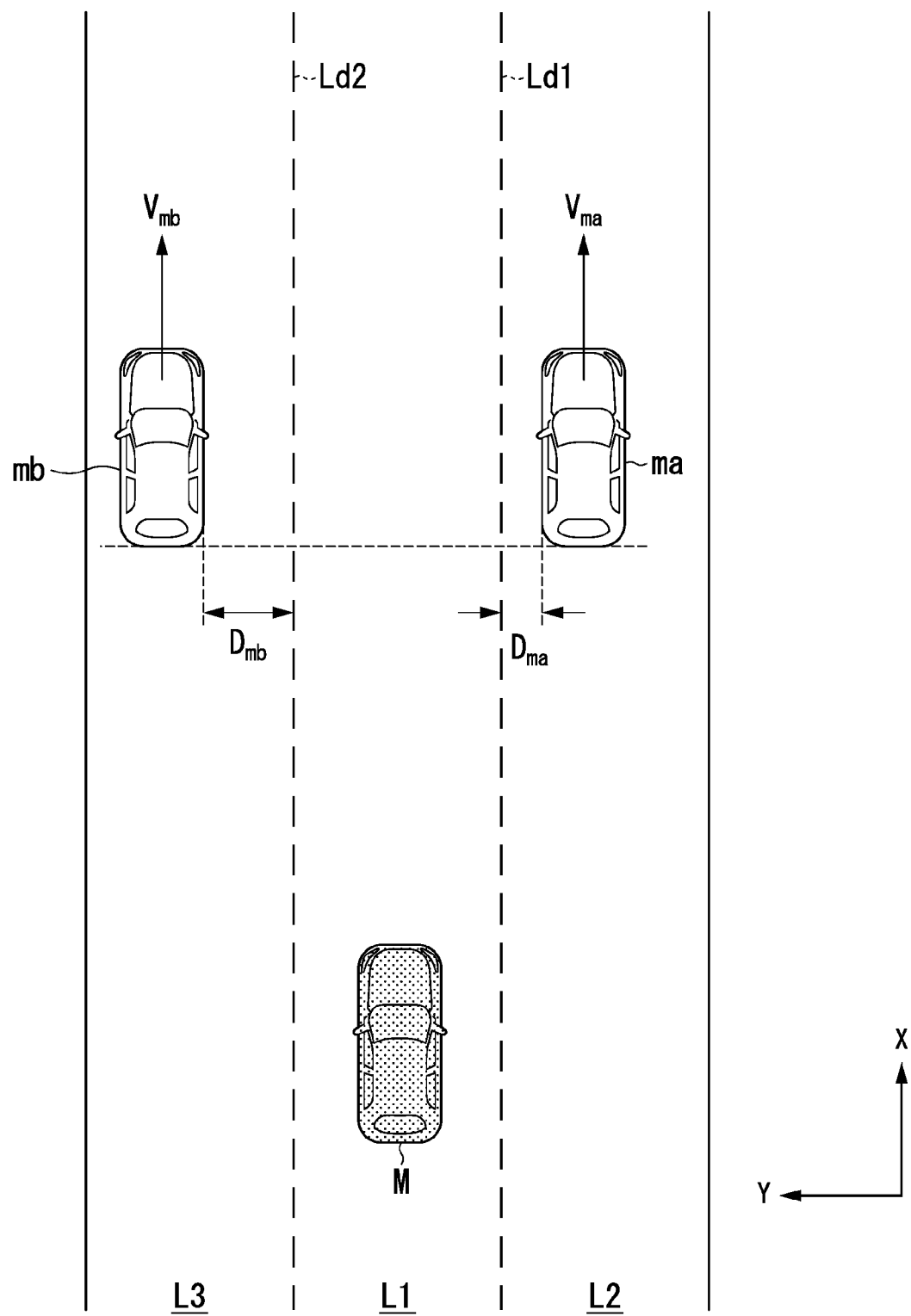
FIG. 7 is a diagram showing another example of a situation in which a plurality of surrounding vehicles are present in the vicinity of a subject vehicle M.

FIG. 7 is a diagram showing another example of a situation in which a plurality of surrounding vehicles are present in the vicinity of a subject vehicle M. In the example shown in the drawing, a surrounding vehicle ma is present on an adjacent lane L2 neighboring on the right side out of two lanes adjacent to an own lane L1, and a surrounding vehicle mb is present on an adjacent lane L3 neighboring on the left side. Such surrounding vehicles ma and mb are positioned at an equal distance from the subject vehicle M, and a speed $V_{ma}$ of the surrounding vehicle ma is the same as a speed $V_{mb}$ of the surrounding vehicle mb. In addition, in the example shown in the drawing, a distance $D_{ma}$ from a partition line Ld1 positioned on the own lane L1 side among partition lines partitioning an adjacent lane L2 to the surrounding vehicle ma is shorter than a distance $D_{mb}$ from a partition line Ld2 positioned on the own lane L1 side among partition lines partitioning an adjacent lane L3 to the surrounding vehicle mb. In such a case, a cutting-in probability P of the surrounding vehicle mb is lower than a cutting-in probability of P of the surrounding vehicle ma. Accordingly, the identifier 124 identifies the surrounding vehicle ma as a cutting-in vehicle.

In addition, for example, the identifier 124 may identify a predetermined point Q at which a lane change from an adjacent lane to the own lane is required by referring to the second map information 62 and increase a cutting-in probability P of a surrounding vehicle in a case in which the surrounding vehicle arrives at (comes to) the predetermined point Q. The predetermined point Q, for example, is a merging point at which another lane merges into the own lane, a lane disappearance point at which an adjacent lane disappears on the course, a passage prohibition point at which passage to an adjacent lane is temporarily prohibited due to construction or the like, or the like.

Figure 8:
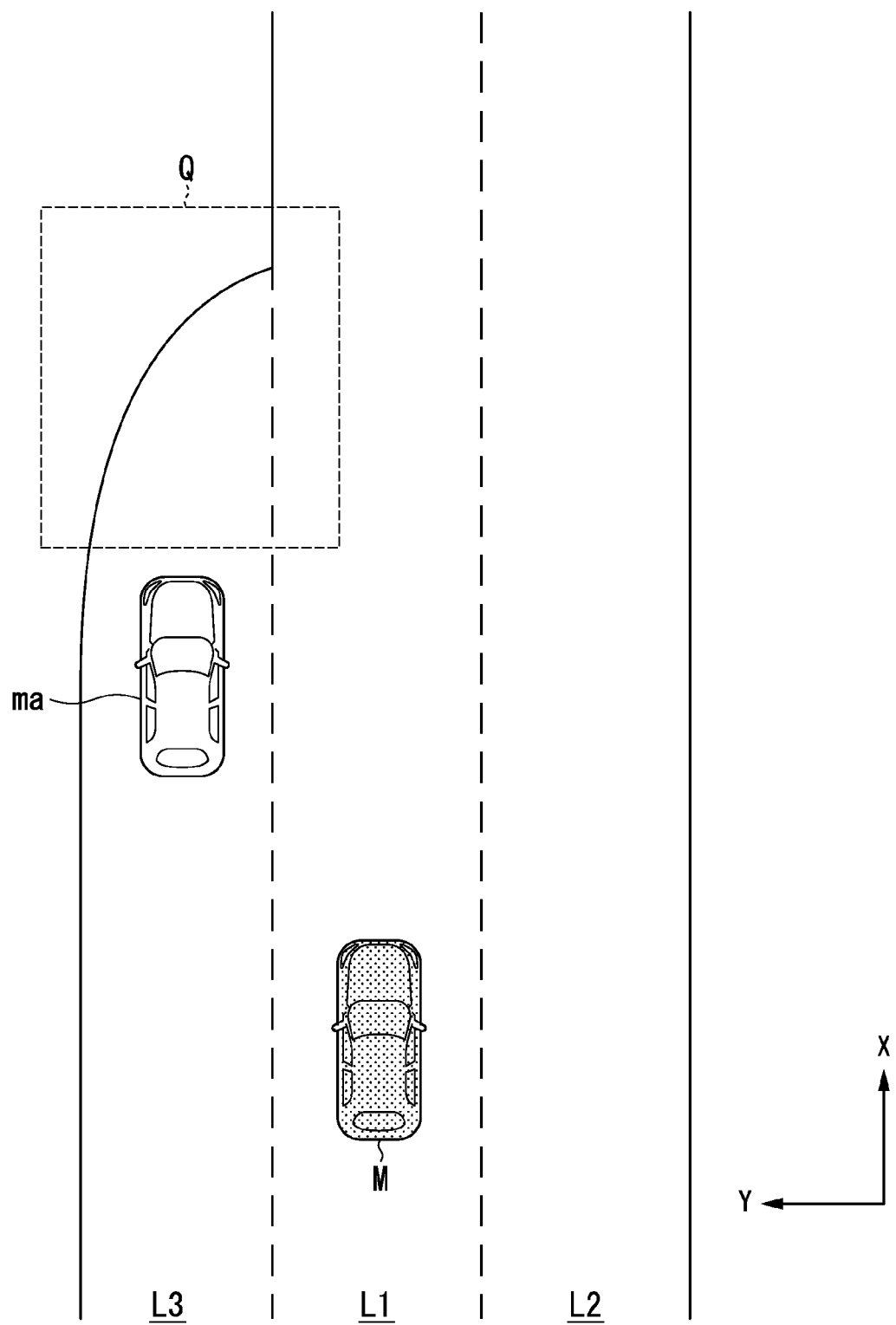
FIG. 8 is a diagram showing one example of a predetermined point Q.

FIG. 8 is a diagram showing one example of a predetermined point Q. In the example shown in the drawing, a lane disappears in the middle of an adjacent lane L3. In such a case, a surrounding vehicle ma running in the adjacent lane L3 is predicted to change lane to an own lane L1 at a certain timing. Accordingly, the identifier 124 sets a cutting-in probability P of a surrounding vehicle that has arrived at a predetermined point Q to be higher than that of a surrounding vehicle that has not arrived at the predetermined point Q. For example, the identifier 124 sets a cutting-in probability P, which has been acquired using the numerical expression (1) described above or the like, to be high by multiplying the cutting-in probability P by a predetermined magnification A (here, A≥1).

Figure 9:
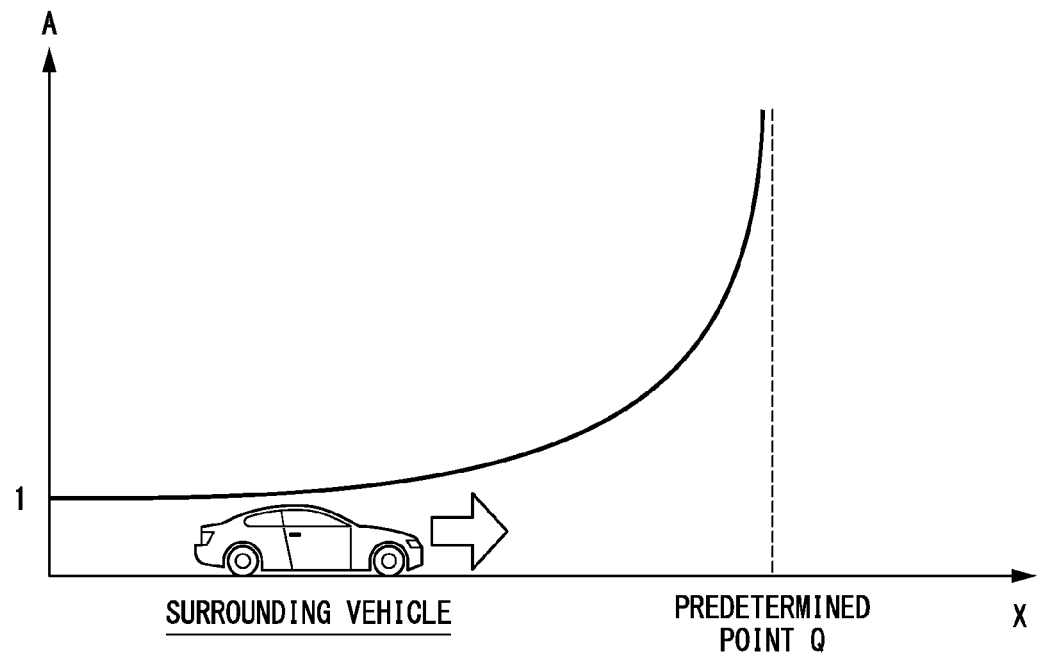
FIG. 9 is a diagram showing one example of a magnification A according to a distance up to a predetermined point Q.

FIG. 9 is a diagram showing one example of a magnification A according to a distance to a predetermined point Q. As in the example shown in the drawing, the identifier 124 sets a cutting-in probability P to be higher by exponentially increasing the magnification A as the surrounding vehicle becomes closer to the predetermined point Q. Accordingly, an appropriate cutting-in probability P can be derived also for a surrounding vehicle not indicating an intention of lane change such as in pulling-over of a vehicle to a road side or turning-on of a turn-signal, or the like before arriving at the predetermined point Q. As a result, even a surrounding vehicle not indicating an intention of lane change, which has a potentially high likelihood of cutting in front of the subject vehicle M, can be identified as a cutting-in vehicle.

In addition, in a case in which prior notice indicating a lane change to a side in front of the subject vehicle M is given by a surrounding vehicle that is a communication partner through inter-vehicle communication with the surrounding vehicle using the communication device 20, the identifier 124 may identify this surrounding vehicle as a cutting-in vehicle.

The second controller 140, for example, includes a running controller 141. The running controller 141 controls the running driving force output device 200, the brake device 210, and the steering device 220 such that the subject vehicle M passes through a target locus generated by the action plan generator 123 at scheduled times.

The running driving force output device 200 outputs a running driving force (torque) for allowing a vehicle to run to driving wheels. The running driving force output device 200, for example, includes a combination of an internal combustion engine, an electric motor, a transmission gear, and the like and an ECU controlling such components. The ECU controls the components described above on the basis of information input from the running controller 141 or information input from the driving operator 80.

The brake device 210, for example, includes a brake caliper, a cylinder delivering hydraulic pressure to the brake caliper, an electric motor generating hydraulic pressure in the cylinder, and a brake ECU. The brake ECU controls the electric motor on the basis of the information input from the running controller 141 such that a brake torque corresponding to a braking operation is output to each vehicle wheel. The brake device 210 may include a mechanism that delivers a hydraulic pressure generated in accordance with an operation for a brake pedal included in the driving operator 80 to the cylinder through a master cylinder as a backup. In addition, the brake device 210 is not limited to the configuration described above and may be an electronic control-type hydraulic brake device that delivers a hydraulic pressure of the master cylinder to the cylinder by controlling an actuator on the basis of information input from the running controller 141.

The steering device 220, for example, includes a steering ECU and an electric motor. The electric motor, for example, changes the direction of the steering wheel by applying a force to a rack and pinion mechanism. The steering ECU changes the direction of the steering wheel by driving the electric motor in accordance with information input from the running controller 141 or information input from the driving operator 80.

In addition, in a case in which a cutting-in vehicle is identified by the identifier 124, temporarily, the running controller 141 deviates from the target speed and the target acceleration determined for a target locus by the action plan generator 123 to decelerate the subject vehicle M to. At this time, the running controller 141 determines a degree of a change in deceleration, in other words, a jerk j (jerk) of the subject vehicle M in accordance with a cutting-in probability P of a surrounding vehicle identified as a cutting-in vehicle.

Figure 10:
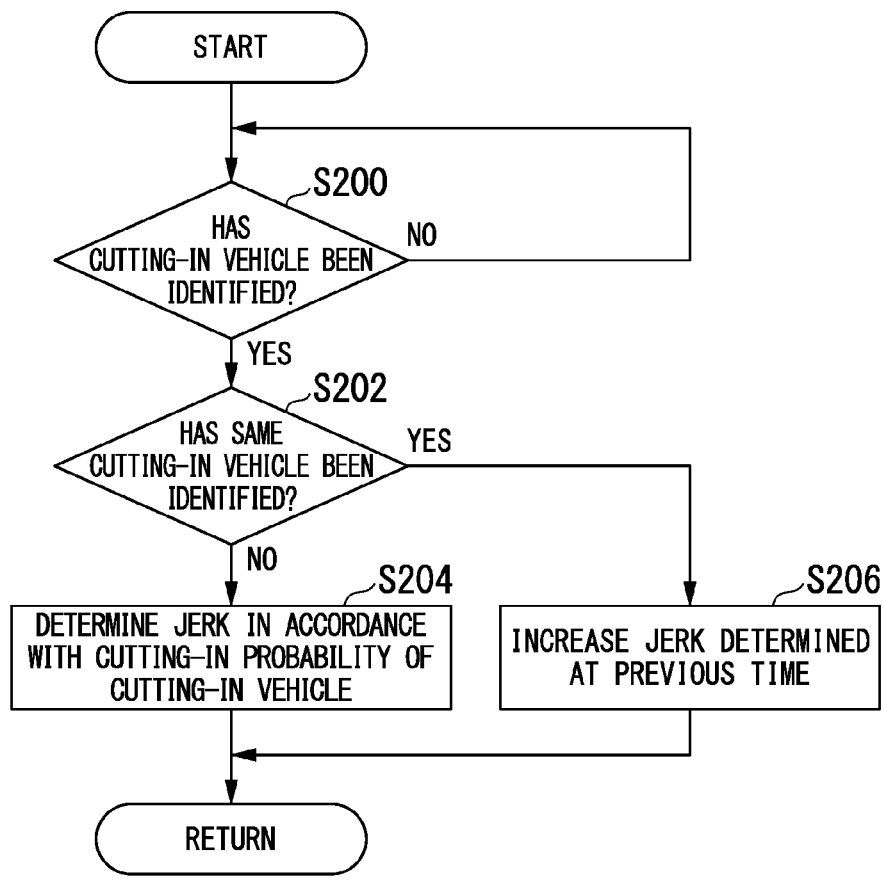
FIG. 10 is a flowchart showing one example of a process executed by a running controller 141.

FIG. 10 is a flowchart showing one example of a process executed by the running controller 141. The process of this flowchart, for example, may be repeatedly performed at predetermined time intervals.

First, the running controller 141 waits until a cutting-in vehicle is identified by the identifier 124 (Step S200). When a cutting-in vehicle is identified by the identifier 124, the running controller 141 determines whether or not a cutting-in vehicle identified at a previous time and a cutting-in vehicle identified at this time are the same (Step S202).

In a case in which a cutting-in vehicle identified at a previous time and the cutting-in vehicle identified at this time are not the same, the running controller 141 determines a jerk j at the time of decelerating the subject vehicle M in accordance with a cutting-in probability P of a surrounding vehicle identified as a cutting-in vehicle at this time (Step S204).

For example, the running controller 141 increases a maximum value of the jerk j in accordance with an increase in the cutting-in probability P and decreases the maximum value of the jerk j in accordance with a decrease in the cutting-in probability P.

Figure 11:
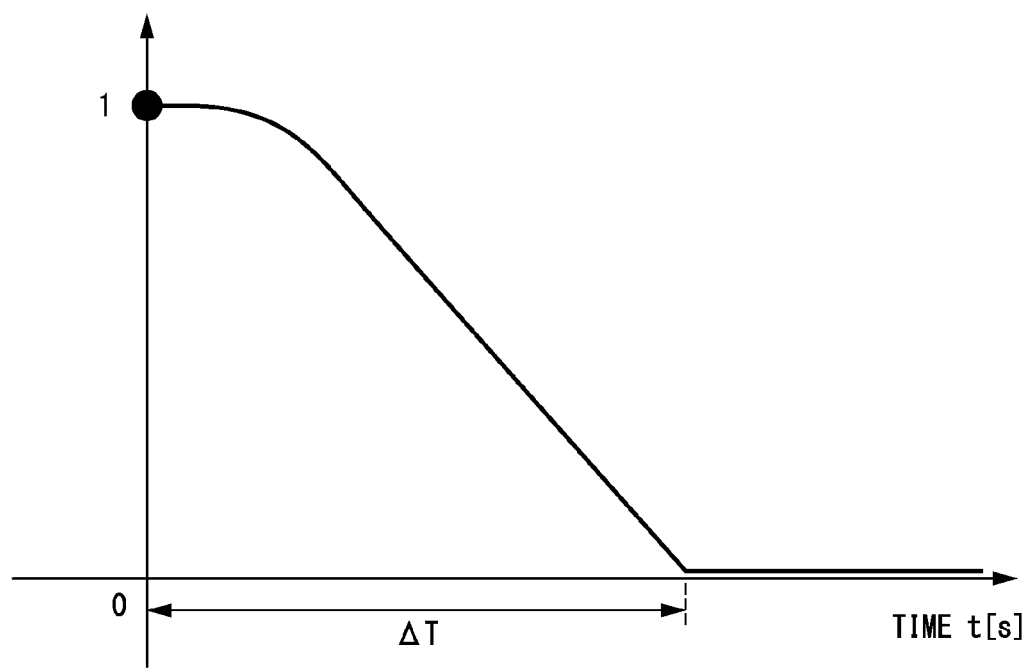
FIG. 11 is a diagram showing one example of a jerk j determined in accordance with a cutting-in probability $P_a$ of a certain cutting-in vehicle ma.

FIG. 11 is a diagram showing one example of a jerk j determined in accordance with a cutting-in probability $P_a$ of a certain cutting-in vehicle ma. In the drawing, the horizontal axis represents a time t (for example, in units of [s]), and the vertical axis represents a jerk j. In the example shown in the drawing, the jerk j is normalized such that a maximum value thereof becomes "1." For example, the running controller 141 sets the maximum value of the jerk j to "1" in accordance with the cutting-in probability $P_a$ and sets the characteristic of the jerk j to have a trend in which it decreases from a maximum value "1" to a minimum value "0" over a predetermined time ΔT.

Figure 12:
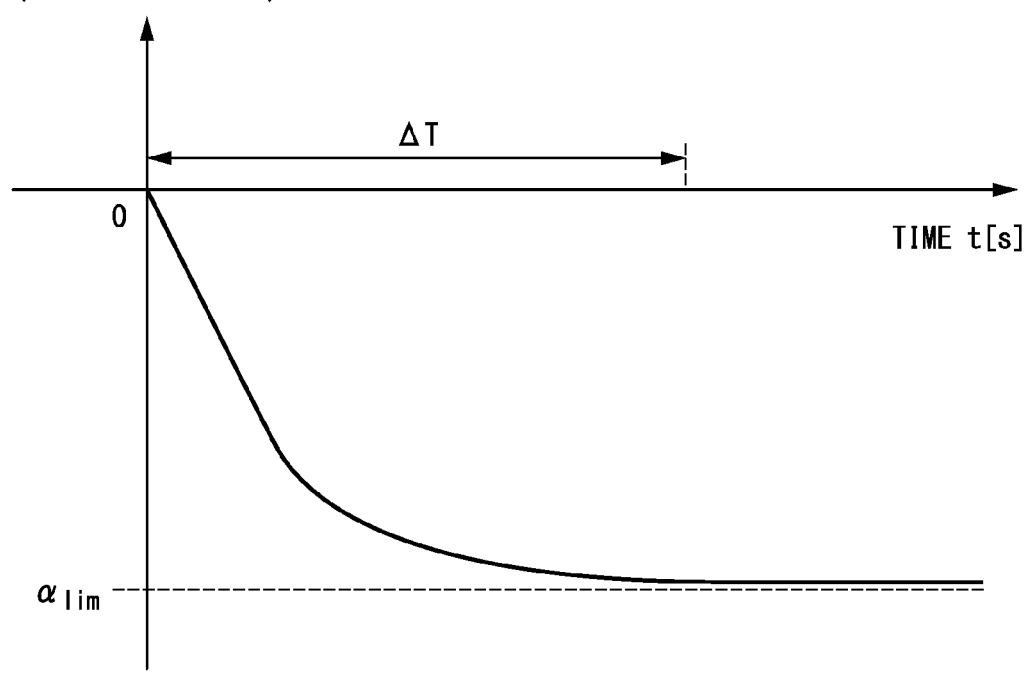
FIG. 12 is a diagram showing one example of deceleration determined on the basis of the jerk j shown in FIG. 11.

FIG. 12 is a diagram showing one example of deceleration determined on the basis of the jerk j shown in FIG. 11. In the drawing, the horizontal axis represents a time (for example, in units of [s]), and the vertical axis represents an acceleration α in a negative direction as a deceleration. As shown in the drawing, the running controller 141 increases a deceleration in accordance with the trend of change in the jerk j shown in FIG. 11 until the deceleration approaches a limit $α_{lim}$ of the deceleration determined in advance.

Figure 13:
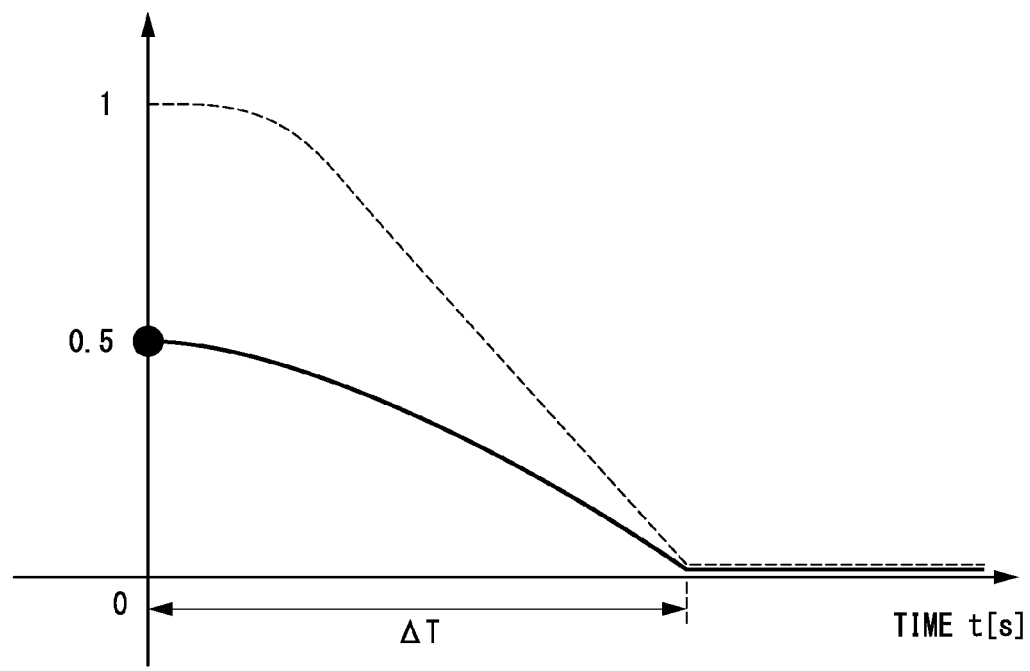
FIG. 13 is a diagram showing one example of a jerk j determined in accordance with a cutting-in probability $P_b$ of a cutting-in vehicle mb.

FIG. 13 is a diagram showing one example of a jerk j determined in accordance with a cutting-in probability $P_b$ of a cutting-in vehicle mb. The cutting-in probability $P_b$ is assumed to be lower than the cutting-in probability $P_a$ described above. In a situation in which $P_a > P_b$, for example, it can be regarded that a surrounding vehicle is present closer to the own lane, a relative speed with respect to a surrounding vehicle is higher, a greater relative distance with respect to a surrounding vehicle has opened up, or a surrounding vehicle is indicating an intention of performing a lane change more strongly in a situation in which the cutting-in vehicle mb is identified than in a situation in which the cutting-in vehicle ma is identified. In addition, in this situation, it can be regarded that a situation in which the cutting-in vehicle ma is identified is that of being closer to the predetermined point Q than a situation in which the cutting-in vehicle mb is identified. In this case, the running controller 141 sets a maximum value of the jerk j to be lower than a maximum value of the jerk j determined in the situation in which the cutting-in vehicle ma is identified (a maximum value="1" in the numerical example described above) and sets characteristics of the jerk j to have a trend in which it decreases from the maximum value "1" to the minimum value "0" over a predetermined time ΔT. In the example shown in the drawing, a maximum value of the jerk j is determined as being 0.5.

Figure 14:
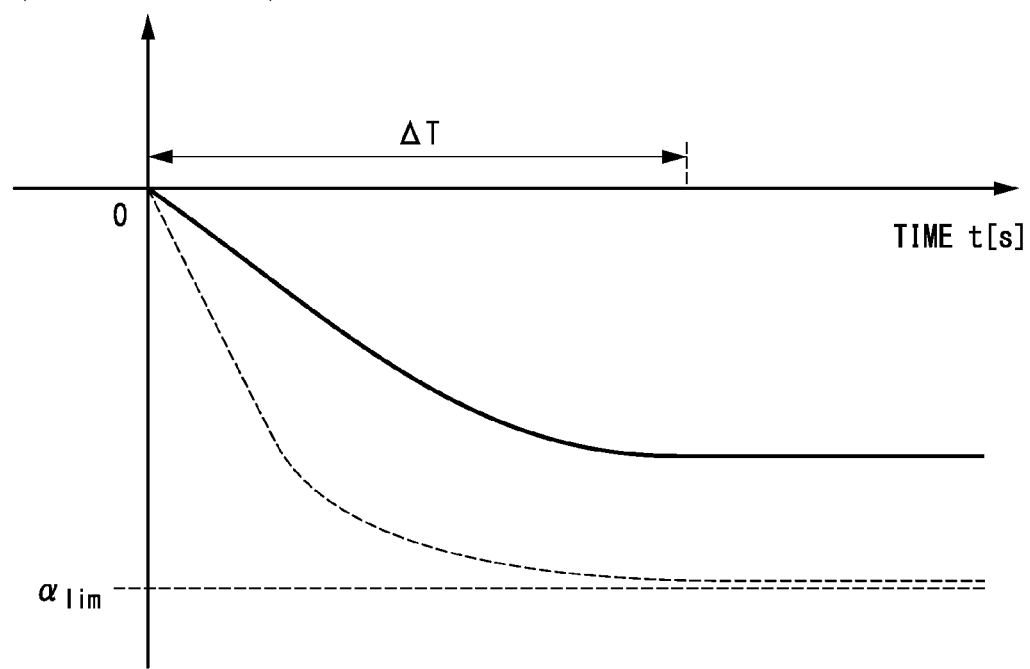
FIG. 14 is a diagram showing one example of a deceleration determined on the basis of the jerk j shown in FIG. 13.

FIG. 14 is a diagram showing one example of a deceleration determined on the basis of the jerk j shown in FIG. 13. As shown in the drawing, the running controller 141 increases a deceleration in accordance with a trend of change in the jerk j shown in FIG. 13 until it approaches the limit $α_{lim}$ of the deceleration determined in advance. As shown in the drawing, the maximum value of the jerk j becomes smaller in the case of the cutting-in probability $P_b$ than in the case of the cutting-in probability $P_a$, and accordingly, the deceleration increases with a gentler trend over the same predetermined time ΔT.

In addition, the running controller 141 may determine a trend of change in the jerk j in accordance with a cutting-in probability P of a cutting-in vehicle.

Figure 15:
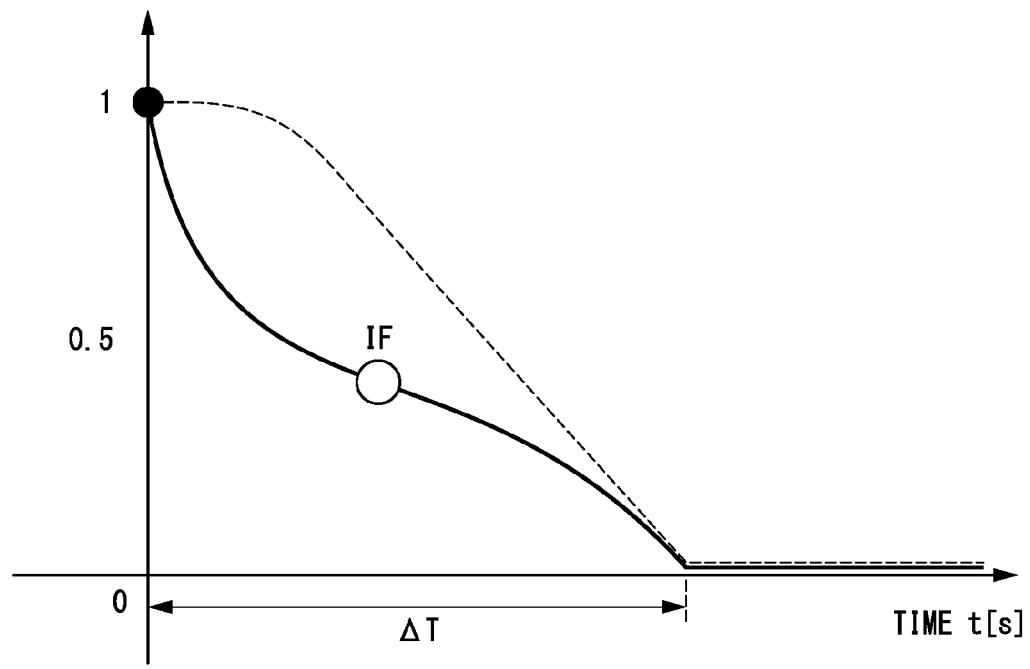
FIG. 15 is a diagram showing another example of a jerk j determined in accordance with a cutting-in probability $P_b$ of a cutting-in vehicle mb.

FIG. 15 is a diagram showing another example of a jerk j determined in accordance with a cutting-in probability $P_b$ of a cutting-in vehicle mb. For example, the running controller 141 may place an inflection point IF on a curve representing characteristics of the jerk j, and configure a trend of change in the jerk j to be different before and after the inflection point IF.

Figure 16:
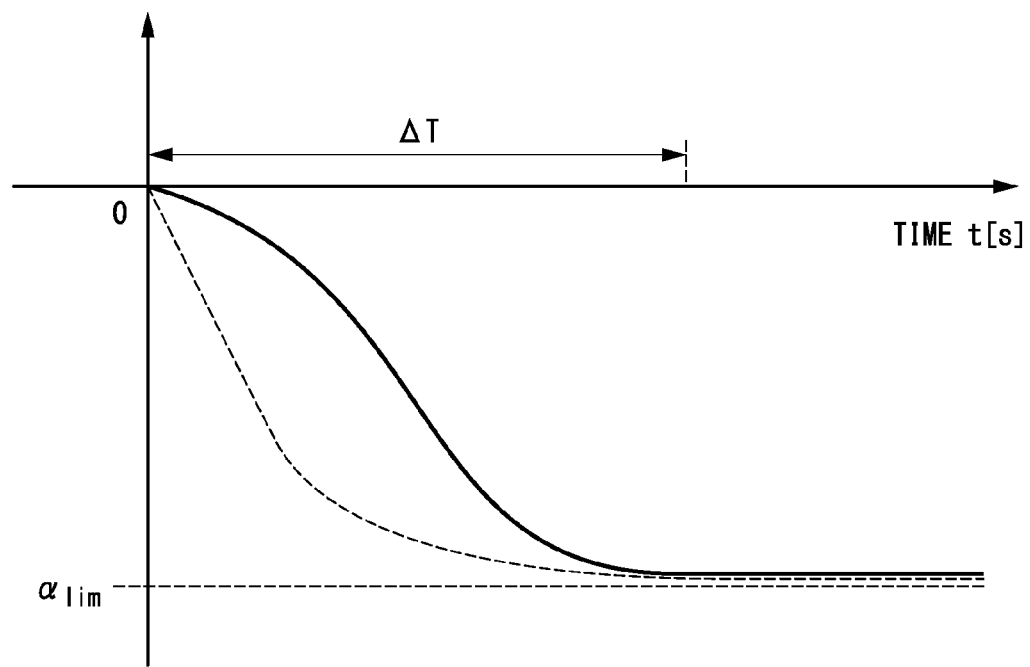
FIG. 16 is a diagram showing one example of deceleration determined on the basis of the jerk j shown in FIG. 15.

FIG. 16 is a diagram showing one example of deceleration determined on the basis of the jerk j shown in FIG. 15. As described above, by placing the inflection point IF at which a degree of the decrease in the jerk j is different on the curve representing the characteristics of the jerk j, the trend of the increase changes more significant in the process of increasing the deceleration. For this reason, the running controller 141 intensifies a deceleration more gently in an initial stage in which the subject vehicle M is decelerated and decelerates the subject vehicle M more strongly in a middle stage.

Here, the description presented with reference to the flowchart will be continued. In the process of S202, in a case in which a cutting-in vehicle identified at a previous time and a cutting-in vehicle identified at this time are the same, the running controller 141 increases the maximum value of the jerk j determined at a previous time (Step S206).

For example, in a case in which the maximum value of the jerk j is set to 0.5 in the process of a previous time, the running controller 141 sets the maximum value of the jerk j to 0.7 in the process of this time. Accordingly, while the process is repeated at predetermined time intervals, by quickly decelerating the subject vehicle M for a surrounding vehicle indicating an intention of cutting-in several times, the way can be yielded. As a result, speed control in consideration of surrounding vehicles can be performed.

In addition, the running controller 141 may determine whether or not the same vehicle is identified as a cutting-in vehicle by the identifier 124 a predetermined number of times or more as the process of S202. In this way, the process of this flowchart ends.

According to the first embodiment described above, by including the external system recognizer 121 that recognizes one or more surrounding vehicles present in the other lanes other than an own lane in which the subject vehicle M is present, the identifier 124 that identifies a surrounding vehicle of which a cutting-in probability P, which indicates a likelihood of a surrounding vehicle recognized by the external system recognizer 121 cutting in front of the subject vehicle M, is equal to or higher than a threshold as a cutting-in vehicle, and the running controller 141 that decelerates the subject vehicle M in a case in which a cutting-in vehicle is identified by the identifier 124 and determines a jerk j representing a degree of change in the deceleration of the subject vehicle in accordance with the cutting-in probability P of the cutting-in vehicle at the time of decelerating the subject vehicle M, appropriate speed control can be performed in accordance with cutting-in of a surrounding vehicle.

For example, at a predetermined point such as a lane reduction point or a merging point, by increasing the maximum value of the jerk j, the subject vehicle M is decelerated with a relatively high deceleration in preparation for cutting-in of a surrounding vehicle. On the other hand, at a point other than the predetermined point described above, by decreasing the maximum value of the jerk j, the subject vehicle M is gently decelerated. Accordingly, discomforting braking when a prediction of cutting-in is omitted can be reduced.

In addition, according to the first embodiment described above, in a case in which a same surrounding vehicle is consecutively identified as a cutting-in vehicle as a result of repetition of the process, by increasing the maximum value of the jerk j regardless of the cutting-in probability P, the way can be yielded to a surrounding vehicle indicating an intention of cutting-in several times by quickly decelerating the subject vehicle M. As a result, speed control in consideration of surrounding vehicles can be performed.

Modified Example of First Embodiment

Hereinafter, a modified example of the first embodiment will be described. In the modified example of the first embodiment, in a case in which the jerk j is determined in accordance with a cutting-in probability P of a surrounding vehicle identified as a cutting-in vehicle, the maximum value of the jerk j is determined in accordance with the magnitude of the time-to-collision TTC that is one element for determining the cutting-in probability P.

Figure 17:
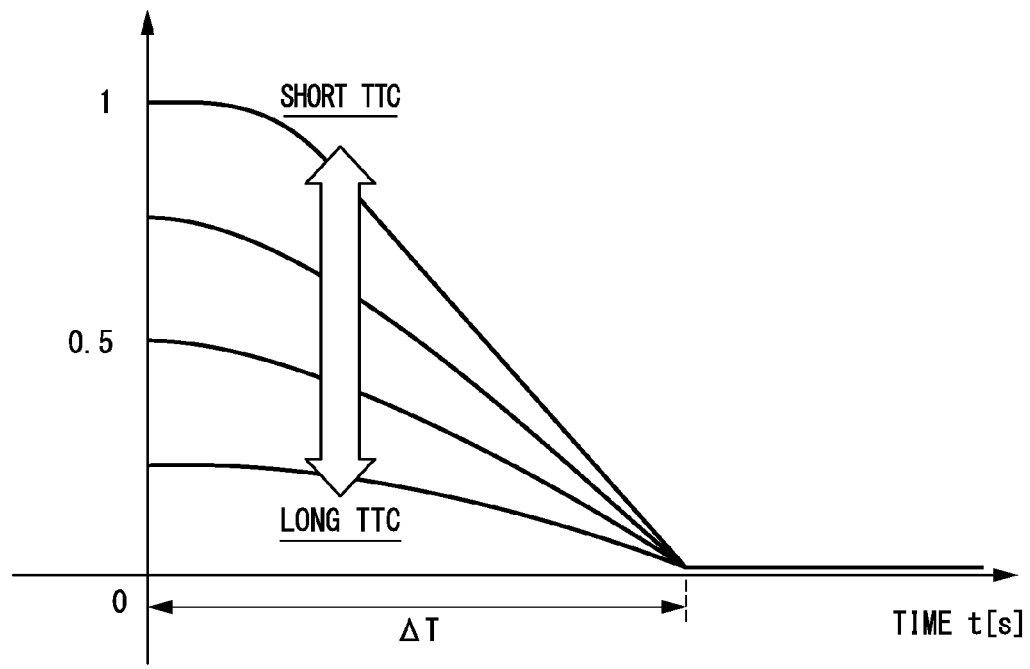
FIG. 17 is a diagram showing one example of a maximum value of a jerk j determined in accordance with a time-to-collision TTC.
Figure 18:
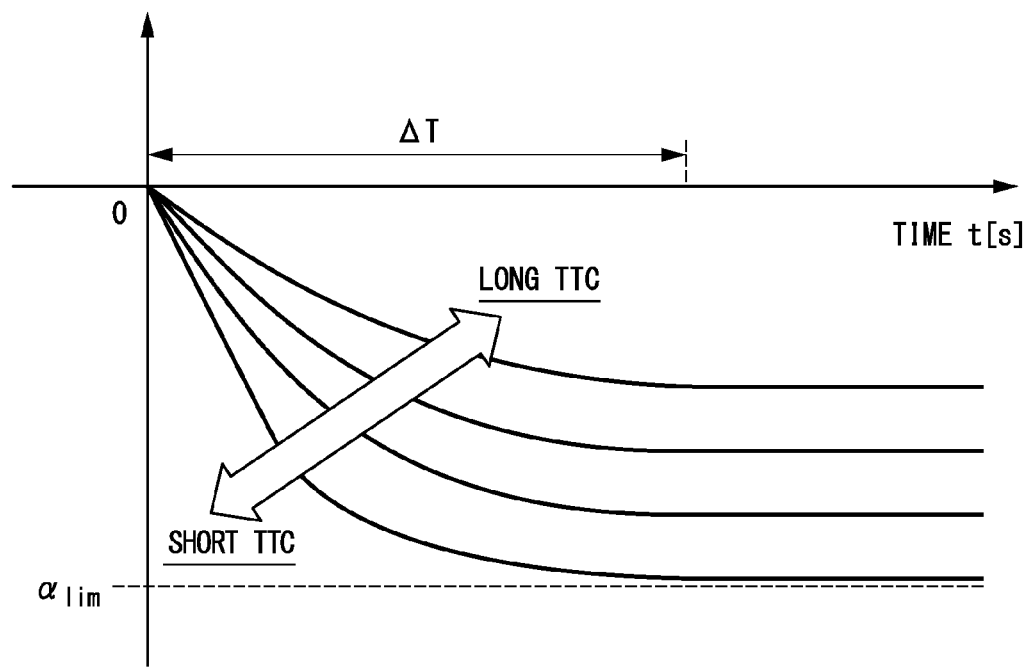
FIG. 18 is a diagram showing one example of deceleration determined on the basis of the jerk j shown in FIG. 17.

FIG. 17 is a diagram showing one example of a maximum value of a jerk j determined in accordance with a time-to-collision TTC. In addition, FIG. 18 is a diagram showing one example of deceleration determined on the basis of the jerk j shown in FIG. 17. As in the example shown in FIG. 17, the running controller 141 decreases the maximum value of the jerk j as the time-to-collision TTC becomes longer and increases the maximum value as the time-to-collision TTC becomes shorter. Accordingly, as shown in FIG. 18, the deceleration gently is configured to increase as the time-to-collision TTC becomes longer. In this way, when the time-to-collision TTC becomes longer, there is an extension of time until the cutting-in vehicle is caught up with in a case in which the cutting-in probability P is high, and accordingly, the cutting-in vehicle can be handled with a relative gentle deceleration.

Second Embodiment

Hereinafter, a second embodiment will be described. In the second embodiment, in a case in which a plurality of surrounding vehicles are recognized, a cutting-in probability P of each surrounding vehicle is derived on the basis of a first index value A acquired in consideration of a time-to-collision TTC between a subject vehicle M and each surrounding vehicle and a time-to-collision TTC between surrounding vehicles and a second index value B acquired in consideration of a distance D from each surrounding vehicle to a partition line Ld and a lateral velocity $V_Y$ of each surrounding vehicle, which is different from the first embodiment described above. Hereinafter, points different from the first embodiment will be focused in description, and description of functions and the like that are common to the first embodiment will be omitted.

Figure 19:
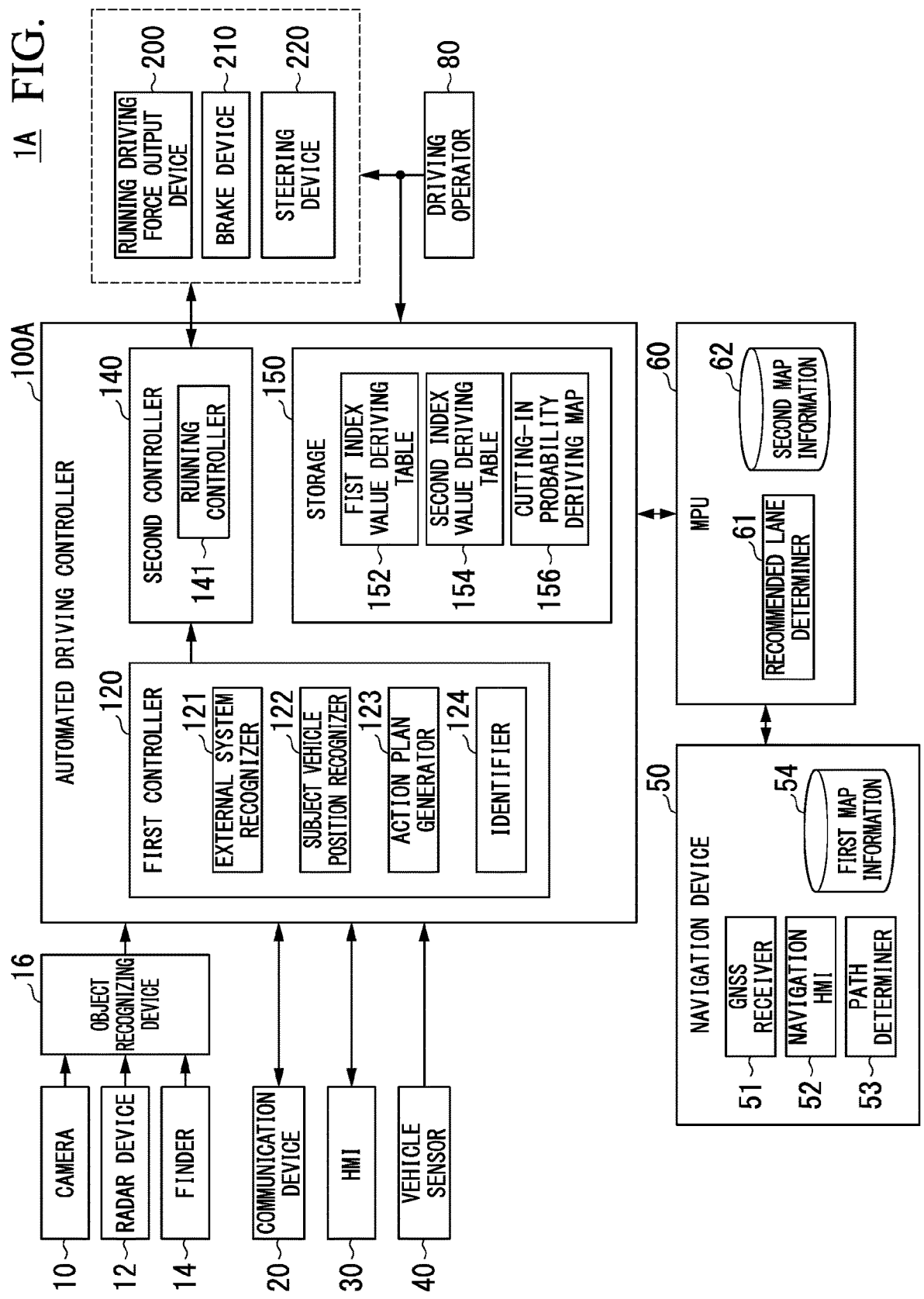
FIG. 19 is a configuration diagram of a vehicle control system 1A according to a second embodiment.

FIG. 19 is a configuration diagram of a vehicle control system 1A according to the second embodiment. The vehicle control system 1A according to the second embodiment, for example, includes a camera 10, a radar device 12, a finder 14, an object recognizing device 16, a communication device 20, an HMI 30, a vehicle sensor 40, a navigation device 50, an MPU 60, a driving operator 80, a running driving force output device 200, a brake device 210, a steering device 220, and an automated driving controller 100A as the configuration described above.

The automated driving controller 100A according to the second embodiment includes the first controller 120, the second controller 140, and the storage 150 described above. The storage 150, for example, is realized by an HDD or a flash memory. In the storage 150, a first index value deriving table 152, a second index value deriving map 154, and a cutting-in probability deriving map 156 to be described later are stored.

Figure 20:
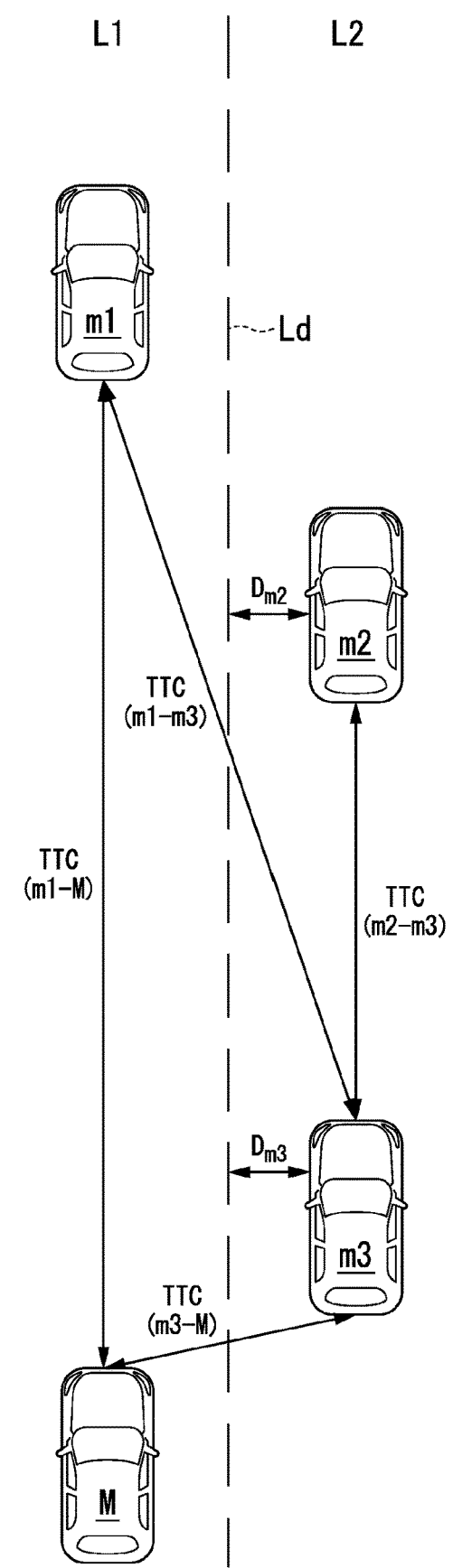
FIG. 20 is a diagram showing one example of a situation in which an identifier 124 according to the second embodiment derives a cutting-in probability P.

FIG. 20 is a diagram showing one example of a situation in which an identifier 124 according to the second embodiment derives a cutting-in probability P. In the drawing, m1 represents a first vehicle running in front of a subject vehicle M in a first lane (own lane) L1 in which the subject vehicle M is running, m2 represents a second vehicle running in a second lane (adjacent lane) L2 adjacent to the first lane L1 and running on a further front side than the subject vehicle M, and m3 represents a third vehicle running in the second lane L2 and running a side on a further rear side than the second vehicle m1.

The identifier 124 determines a target surrounding vehicle of which a cutting-in probability P is to be derived among a plurality of surrounding vehicles recognized by the external system recognizer 121 and derives a cutting-in probability P of this vehicle. For example, as shown in the drawing, in a case in which the first vehicle m1, the second vehicle m2, and the third vehicle m3 described above are recognized by the external system recognizer 121, the identifier 124 determines a surrounding vehicle that is a processing target from among these vehicles. In the following description, it will be assumed that the surrounding vehicle that is a processing target is the third vehicle m3.

In order to derive a cutting-in probability P of the third vehicle m3 that is the processing target, first, the identifier 124 derives a time-to-collision TTC(M−m1) between the subject vehicle M and the first vehicle m1, a time-to-collision TTC(M−m3) between the subject vehicle M and the third vehicle m3, a time-to-collision TTC(m1−m3) between the first vehicle m1 and the third vehicle m3, and a time-to-collision TTC(m2−m3) between the second vehicle m2 and the third vehicle m3.

The identifier 124 derives a first index value A for each combination of a plurality of vehicles that is one set of two vehicles that are targets at the time of deriving the time-to-collision TTC on the basis of each derived time-to-collision TTC and the first index value deriving table 152 stored in the storage 150.

Figures 21, 22:
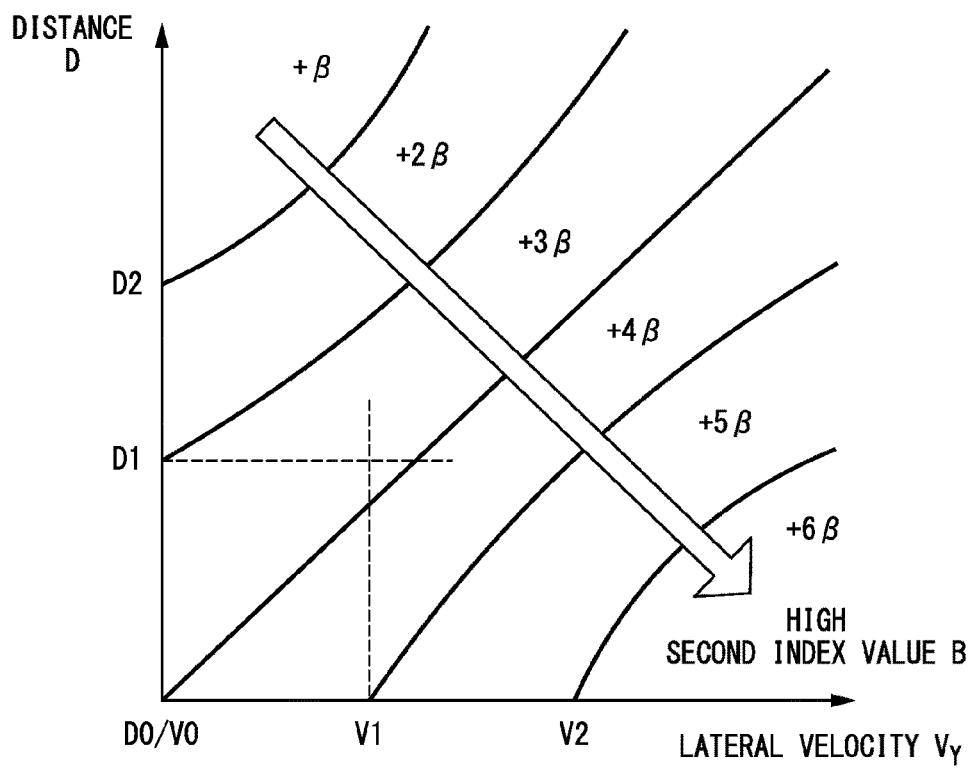
FIG. 21 is a diagram showing one example of a first index value deriving table 152.
FIG. 22 is a diagram showing one example of a second index value deriving map 154.

FIG. 21 is a diagram showing one example of the first index value deriving table 152. In the first index value deriving table 152, a numerical range that may be taken as a time-to-collision TTC of each set of vehicles is associated with each of numerical values $\alpha 1$ to an determined in advance as candidates for the first index value A. For example, in a case in which the time-to-collision TTC(M−m1) is in a numerical range of 0.0 to 1.0, the time-to-collision TTC(M−m3) is in a numerical range of 0.0 to 0.5, the time-to-collision TTC(m1−m3) is in a numerical range of 0.0 to 1.0, and the time-to-collision TTC(m2−m3) is in a numerical range of 0.0 to 1.0, the identifier 124 determines a first index value A for a combination of a set of the vehicles (M−m1), a set of the vehicles (M−m3), a set of the vehicles (m1−m3), and a set of the vehicles (m2−m3) that are targets at the time of deriving the time-to-collision TTC as being $\alpha 1$.

The numerical values $\alpha 1$ to an that are candidates for the first index value A are set to have a trend in which the numerical values become larger in a case in which the time-to-collision TTC(M−m1) between the subject vehicle M and the first vehicle m1 is long than in a case in which the time-to-collision TTC(M–m1) is short. In addition, the numerical values α1 to an are set to have a trend in which the numerical values become larger in a case in which the time-to-collision TTC(m1–m3) between the first vehicle m1 and the third vehicle m3 is long than in a case in which the time-to-collision TTC(m1–m3) is short. In addition, the numerical values α1 to an are set to have a trend in which the numerical values become larger in a case in which the time-to-collision TTC(m2–m3) between the second vehicle m2 and the third vehicle m3 is short than in a case in which the time-to-collision TTC(m2–m3) is long. In addition, the numerical values α1 to an are set to have a trend in which the numerical values become larger in a case in which the time-to-collision TTC(M–m1) between the subject vehicle M and the first vehicle m1 is longer than the time-to-collision TTC(m2–m3) between the second vehicle m2 and the third vehicle m3 than in a case in which the time-to-collision TTC(M–m1) is shorter than the time-to-collision TTC(m2–m3).

The first index value deriving table 152 may be generated in advance on the basis of a correlation between a first index value A derived in advance from results of observations of the third vehicles m3 that actually changed lanes, an experimental technique, a simulation, or the like and a time-to-collision TTC between vehicles forming one set of two vehicles in advance. For example, vehicles that are one set of two vehicles are the subject vehicle M and the first vehicle m1, the subject vehicle M and the third vehicle m3, the first vehicle m1 and the third vehicle m3, and the second vehicle m2 and the third vehicle m3 excluding the first vehicle m1 and the second vehicle m2. In addition, for deriving a first index value A, instead of (or in addition to) the first index value deriving table 152, a map or a function may be used.

Next, the identifier 124 derives a second index value B on the basis of a distance D between the third vehicle m3 and a partition line Ld and a lateral velocity $V_Y$ of the third vehicle m3, and the second index value deriving map 154 stored in the storage 150 on the basis of results of recognition acquired by the external system recognizer 121.

FIG. 22 is a diagram showing one example of the second index value deriving map 154. In the second index value deriving map 154, a numerical value that may be taken as a distance D and a numerical value that may be taken as a lateral velocity $V_Y$ (a direction of approach to the partition line Ld is positive) of the third vehicle m3 are associated with each numerical value β determined as a candidate for the second index value B in advance. For example, in a case in which the distance D is D1, and the lateral velocity $V_Y$ is V1, the identifier 124 determines the second index value B as being 3β.

Each numerical value β that is a candidate for the second index value B is set to have a trend in which it becomes larger as the distance D is longer. In addition, each numerical value β is set to have a trend in which it becomes larger as the lateral velocity $V_Y$ is higher. The second index value deriving map 154 is generated on the basis of a correlation among the second index value B derived from results of observations of the third vehicle m3 that actually change lanes, an experimental technique, a simulation, or the like, the distance D, and the lateral velocity $V_Y$ of the third vehicle m3 in advance.

Next, the identifier 124 derives a cutting-in probability P representing a likelihood of the third vehicle m to change lane to the first lane L1 on the basis of the first index value A and the second index value B that have been derived and the cutting-in probability deriving map 156 stored in the storage 150.

Figure 23:
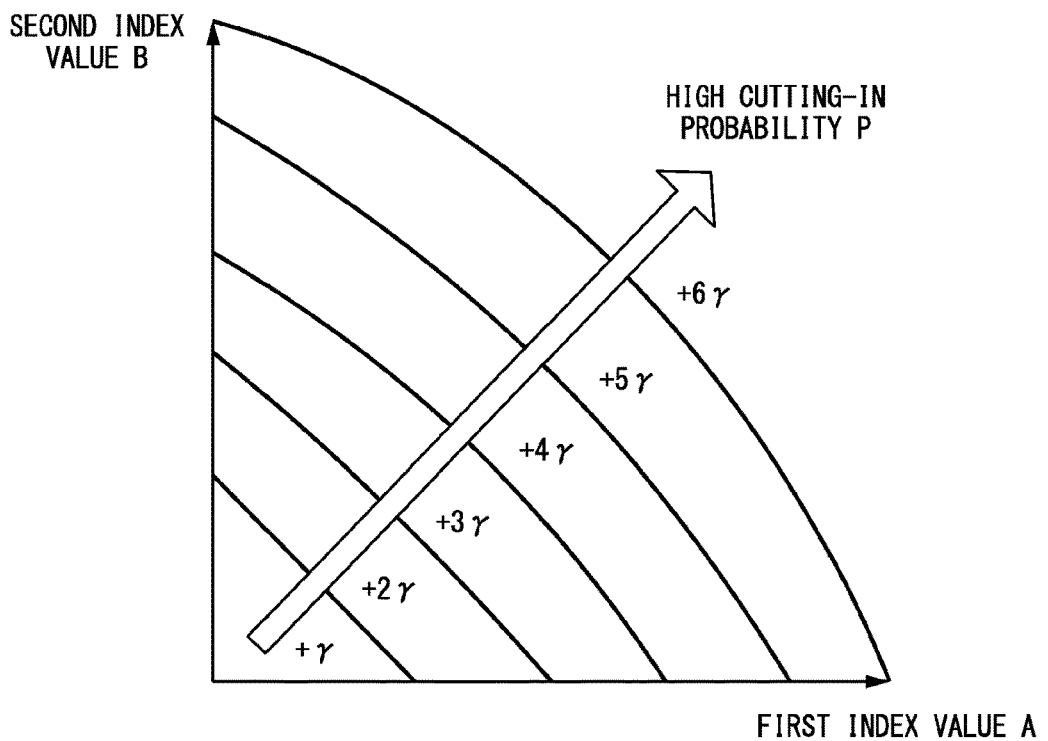
FIG. 23 is a diagram showing one example of a cutting-in probability deriving map 156.

FIG. 23 is a diagram showing one example of the cutting-in probability deriving map 156. In the cutting-in probability deriving map 156, a first index value A and a second index value B are associated with each numerical value γ determined in advance as a candidate for the cutting-in probability P. Each numerical value γ that becomes a candidate for the cutting-in probability P is set to have a trend in which it becomes larger as the first index value A or the second index value B is larger. The cutting-in probability deriving map 156 is generated on the basis of a correlation between a first index value A and a second index value B derived from results of observations of the third vehicle m3 that actually changed lanes, an experimental technique, a simulation, or the like in advance. In this way, similar to the embodiment described above, a cutting-in probability P of a surrounding vehicle of interest (the third vehicle m3 in the example described above) can be derived.

In addition, in the example described above, although the distance D and the lateral velocity $V_Y$ of the third vehicle m3 are used for deriving a second index value B, for the deriving a second index value B, only the distance D or an additional arbitrary parameter in addition to the distance D and the lateral velocity $V_Y$ may be used. For example, for deriving a second index value B, the amount of movement of the third vehicle m3 in a horizontal direction (a lane width direction) in a predetermined time may be used in addition to the distance D between the third vehicle m3 and the partition line Ld and the lateral velocity $V_Y$ of the third vehicle m3. For example, the identifier 124 may derive the second index value B to be larger as the amount of movement in the horizontal direction described above becomes higher.

In addition, the identifier 124 may derive a second index value B to have a trend in which it is larger in a case in which a moving direction relating to the horizontal direction of the third vehicle m3 is a direction toward the first lane than in a case in which the moving direction relating to the horizontal direction of the third vehicle m3 is not a direction toward the first lane L1. Accordingly, in a case in which the moving direction relating to the horizontal direction of the third vehicle m3 is a direction toward the first lane, a cutting-in probability P of the third vehicle m3 is derived as being higher than in a case in which the moving direction relating to the horizontal direction of the third vehicle m3 is not a direction toward the first lane L1.

In addition, in the example described above, although the time-to-collision TTC has been described to be used for deriving a first index value A, instead of (in addition to) the time-to-collision TTC, at least one of a distance between one set of vehicles, a vehicle head time of one set of vehicles, and a relative speed between one set of vehicles may be used for deriving a first index value A.

For example, in a case in which a distance between two vehicles is used for deriving a first index value A, the first index value A has a trend in which it increases as a distance between the subject vehicle M and the first vehicle m1 becomes longer, a distance between the first vehicle m1 and the third vehicle m3 becomes longer, or a distance between the second vehicle m2 and the third vehicle m3 becomes shorter.

In addition, for example, in a case in which a relative speed between two vehicles is used for deriving a first index value A, the first index value A has a trend in which it becomes larger as a relative speed between the subject vehicle M and the first vehicle m1 is lower, or a speed of the first vehicle m1 is further higher than a speed of the subject vehicle M. In addition, the first index value A has a trend in which it becomes larger as a relative speed between the first vehicle m1 and the third vehicle m3 is lower, or as a speed of the first vehicle m1 is further higher than a speed of the third vehicle m3. In addition, the first index value A has a trend in which it becomes larger as a relative speed between the second vehicle m2 and the third vehicle m3 is lower, or as a speed of the third vehicle m3 is further higher than a speed of the second vehicle m2.

In addition, in a case in which a vehicle head time of two vehicles is used for deriving a first index value A, the first index value A has a trend similar to that acquired in a case in which the time-to-collision TTC is used for deriving a first index value A.

In addition, in the example described above, although the identifier 124 derives a first index value A on the basis of a relation between two vehicles relating to the advancement direction excluding a relation between the first vehicle m1 and the second vehicle m2 relating to the advancement direction, the deriving is not limited thereto, and a first index value A may be derived using a relation between the first vehicle m1 and the second vehicle m2 relating to the advancement direction. In such a case, the first index value A is larger in a case in which the first vehicle m1 is present in front of the second vehicle m2 than in a case in which the first vehicle is not present. In addition, the first index value A becomes larger in a case in which a time-to-collision TTC (or a vehicle head time) between the first vehicle m1 and the second vehicle m2 is long than in a case in which the time-to-collision TTC is short. In addition, the first index value A becomes larger in a case in which a relative speed of the second vehicle m2 with respect to the first vehicle m1 is positive than in a case in which the relative speed is negative, and a cutting-in probability P of the third vehicle m3 increases. In addition, in a case in which the relative speed of the second vehicle m2 with respect to the first vehicle m1 is positive, the first index value A becomes larger as the relative speed is higher. In this way, a cutting-in probability P of the third vehicle m3 becomes high.

In addition, in a case in which there is an obstacle (for example, a stopped vehicle, a fallen object, or the like) in front of the third vehicle m3, the identifier 124 may derive a cutting-in probability P at the time when the third vehicle m3 changes lane from the second lane L2 to the first lane L1 as being higher than in a case in which there is no obstacle. In addition, in a case in which a lane in front of the third vehicle m3 disappears, the identifier 124 may derive a cutting-in probability P at the time when the third vehicle m3 changes lane from the second lane L2 to the first lane L1 as being higher than in a case in which the lane does not disappear.

In addition, in a case in which the first vehicle m1 or the second vehicle m2 is not present, the first index value deriving table 152 corresponding to a case in which the first vehicle m1 or the second vehicle m2 is not present may be used, and a time-to-collision TTC or a vehicle head time between a vehicle that is not present and another vehicle and an inter-vehicle distance between two vehicles may be regarded as a sufficiently large value or infinity. In addition, in a case in which the first vehicle m1 or the second vehicle m2 is not present, the relative speed may be regarded as zero, and a setting value set for a case in which the first vehicle m1 or the second vehicle m2 is not present may be used.

In addition, similar to the first embodiment described above, the identifier 124 may change the cutting-in probability P in accordance with the lighting state of a turn signal of a surrounding vehicle that is a target for deriving a cutting-in probability P. For example, in a case in which a turn signal (a turn signal on the own lane side) of a surrounding vehicle is lighted, the identifier 124 derives a second index value B by referring to a second index value deriving map 154 # for a lighted turn-signal instead of the second index value deriving map 154 described above. The second index value deriving map 154 # for a lighted turn-signal may be stored in the storage 150 in advance.

Figure 24:
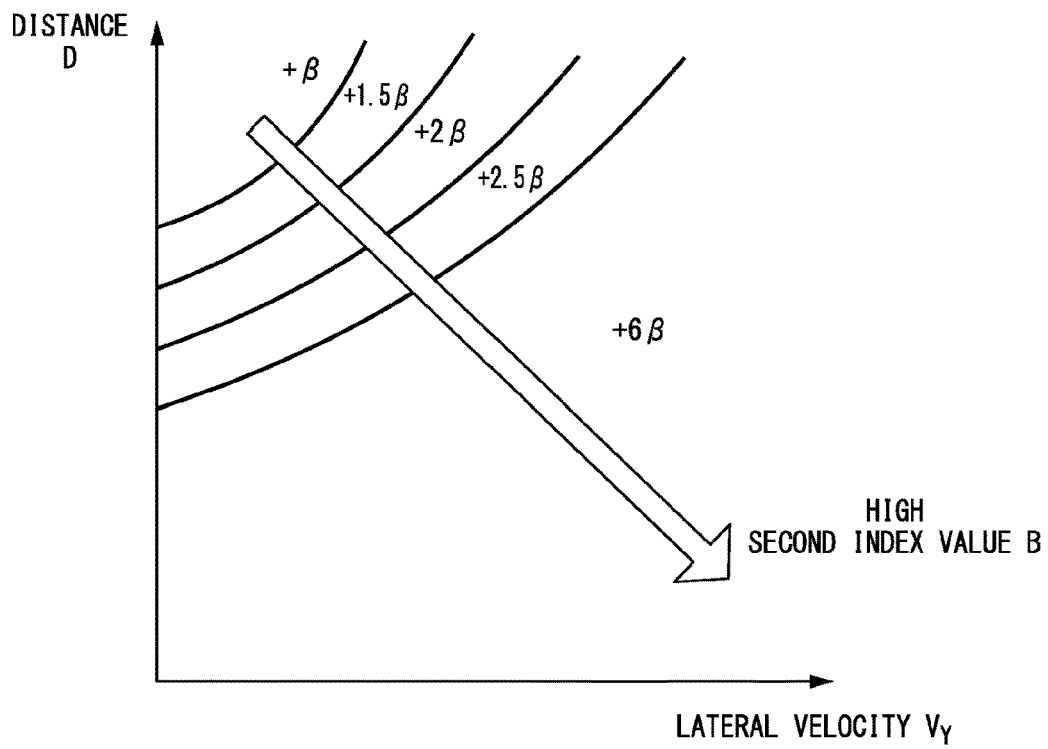
FIG. 24 is a diagram showing one example of a second index value deriving map 154 # for a lighted turn-signal.

FIG. 24 is a diagram showing one example of a second index value deriving map 154 # for a lighted turn-signal. In the second index value deriving map 154 # for a lighted turn-signal, a numerical value that may be taken as a distance D and a numerical value that may be taken as a lateral velocity VY (a direction of approach to a partition line Ld is positive) of the third vehicle m3 are associated with a numerical value β determined in advance as a candidate for the second index value B.

In the second index value deriving map 154 # for a lighted turn-signal, even when the correlation between the distance D and the lateral velocity VY of the third vehicle m3 is the same, each numerical value β that is candidate for the second index value B is set to a larger value than that in the second index value deriving map 154. The second index value deriving map 154 # for a lighted turn-signal is generated on the basis of a correlation among the second index value B derived from results of observations of whether or not the third vehicle m3 actually changed lanes in a case in which a turn signal of the third vehicle m3 is lighted, an experimental technique, a simulation, or the like, the distance D, and the lateral velocity $V_Y$ of the third vehicle. By referring to the second index value deriving map 154 # for a lighted turn-signal, in a case in which an intention of a lane change is presumed in the third vehicle m3, a larger second index value B is derived than in a case in which an intention of performing a lane change is not presumed in the third vehicle m3. As a result, in a case in which a surrounding vehicle indicates an intention of performing a lane change by lighting a turn signal, a cutting-in probability P is derived as being higher.

According to the second embodiment described above, a cutting-in probability P of each surrounding vehicle is derived on the basis of the first index value A acquired in consideration of a time-to-collision TTC between the subject vehicle M and each surrounding vehicle and a time-to-collision TTC between surrounding vehicles and the second index value B acquired in consideration of a distance D from each surrounding vehicle to a partition line Ld and a lateral velocity $V_Y$ of each surrounding vehicle, a surrounding vehicle of which the cutting-in probability P is equal to or higher than a threshold is identified as a cutting-in vehicle, and a jerk j representing a degree of change in the deceleration of the subject vehicle M is determined in accordance with the cutting-in probability P of the cutting-in vehicle, whereby, similar to the first embodiment described above, appropriate speed control can be performed in accordance with cutting-in of a surrounding vehicle.

Third Embodiment

Hereinafter, a third embodiment will be described. In the third embodiment, instead of controlling steering and acceleration/deceleration of the subject vehicle M as automated driving, only driving support control for causing the subject vehicle M to follow a preceding vehicle running immediately before the subject vehicle M is performed, which is different from the first and second embodiments described above. Hereinafter, points different from the first and second embodiments will be focused in description, and description of functions and the like that are common to the first and second embodiments will be omitted.

Figure 25:
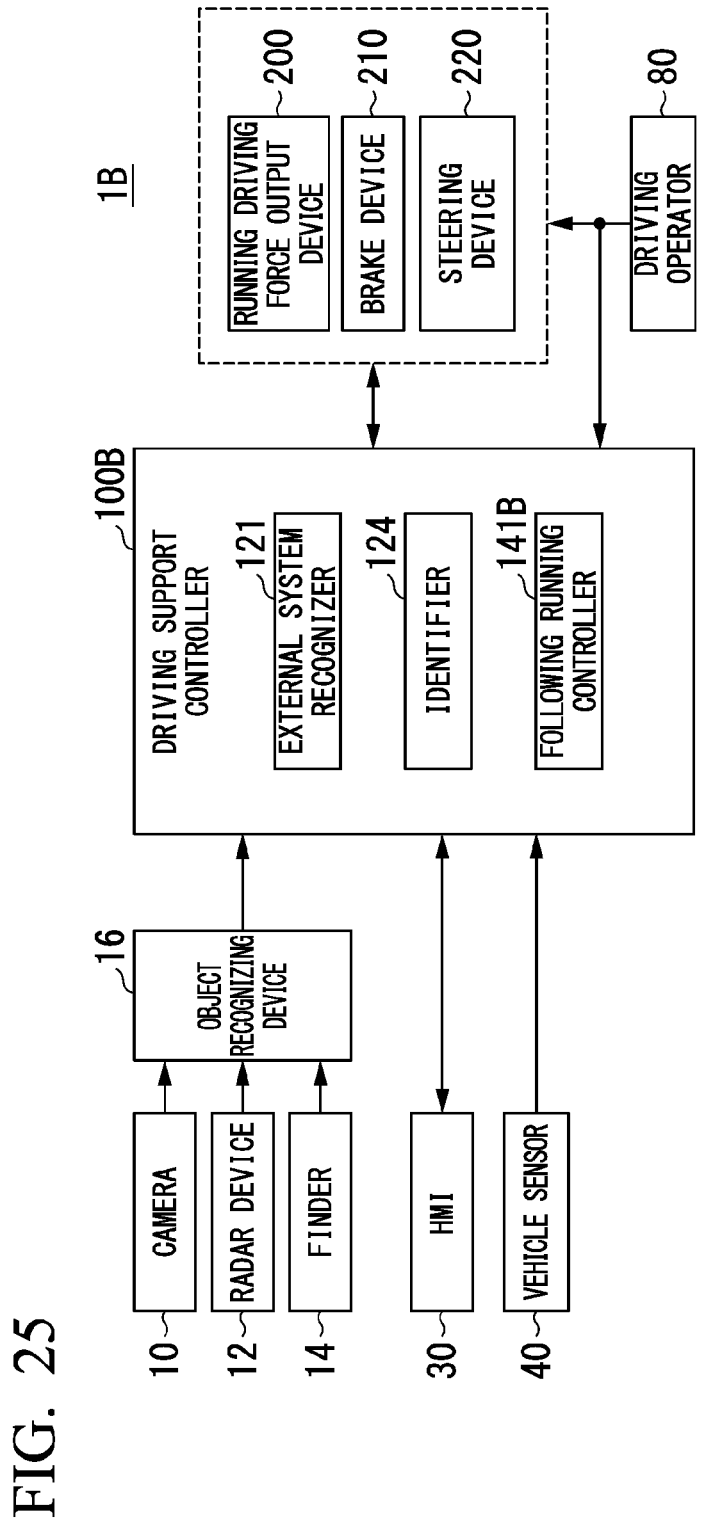
FIG. 25 is a configuration diagram of a vehicle control system 1B according to a third embodiment.

FIG. 25 is a configuration diagram of a vehicle control system 1B according to the third embodiment. The vehicle control system 1B according to the third embodiment, for example, includes a camera 10, a radar device 12, a finder 14, an object recognizing device 16, an HMI 30, a vehicle sensor 40, a driving operator 80, a running driving force output device 200, a brake device 210, a steering device 220, and a driving support controller 100B as the configuration described above.

The HMI 30 according to the third embodiment, for example, is a switch for starting driving support control such as following running or the like.

The driving support controller 100B according to the third embodiment, for example, includes an external system recognizer 121, an identifier 124, and a following running controller 141B. For example, when the HMI 30 is operated, and driving support control is started, the following running controller 141B adjusts acceleration/deceleration of the subject vehicle M such that an inter-vehicle distance between a preceding vehicle recognized by the external system recognizer 121 and the subject vehicle M becomes constant. At this time, for example, in a case in which a surrounding vehicle having a likelihood of cutting into a space between the subject vehicle M and a preceding vehicle is identified as a cutting-in vehicle by the identifier 124, the following running controller 141B determines a jerk j of the subject vehicle M in accordance with a cutting-in probability P of the cutting-in vehicle.

According to the third embodiment described above, also during execution of driving support control of following running, similar to the first embodiment described above, a jerk j indicating a degree of change in the deceleration of the subject vehicle is determined in accordance with a cutting-in probability P of a cutting-in vehicle, and accordingly, appropriate speed control can be performed in accordance with cutting-in of a surrounding vehicle.

In addition, in the third embodiment described above, during execution of driving support control performing following running, although a jerk j of the subject vehicle M has been described as being determined in accordance with a cutting-in probability P of a cutting-in vehicle, the control is not limited thereto. Thus, for example, control of determining a jerk j of the subject vehicle M in accordance with a cutting-in probability P of a cutting-in vehicle may be applied to other driving support control of an automated brake system performing automatic braking in accordance with a time-to-collision TTC for a preceding vehicle and the like.

While forms for performing the present invention has been described using the embodiments, the present invention is not limited to such embodiments at all, and various modifications and substitutions may be made within a range not departing from the concept of the present invention.

DESCRIPTION OF REFERENCE NUMERALS 1, 1A, and 1B Vehicle control system
10 Camera
12 Radar device
14 Finder
16 Object recognizing device
20 Communication device
30 HMI
40 Vehicle sensor
50 Navigation device
51 GNSS receiver
52 Navigation HMI
53 Path determiner
54 First map information
60 MPU
61 Recommended lane determiner
62 Second map information
80 Driving operator
100 and 100A Automated driving controller
100B Driving support controller
120 First controller
121 External system recognizer
122 Subject vehicle position recognizer
123 Action plan generator
124 Identifier
140 Second controller
141 Running controller
141B Following running controller
200 Running driving force output device
210 Brake device
220 Steering device

What is claimed is:

1. A vehicle control system comprising:
a processor that executes instructions to:
recognize one or more surrounding vehicles present in a second lane different from a first lane in which a subject vehicle is present;
in response to recognizing the one or more surrounding vehicles, derive an index value according to a cutting-in probability for a side in front of the subject vehicle for each of the surrounding vehicles;
identify a surrounding vehicle of which the derived index value is equal to or larger than a threshold as a cutting-in vehicle;
decelerate the subject vehicle in accordance with presence of the cutting-in vehicle; and
determine a degree of change in deceleration of the subject vehicle on the basis of the index value of the cutting-in vehicle that is a target when the subject vehicle is decelerated,
wherein the processor further executes instructions to:
perform a process of deriving the index value for each of the surrounding vehicles at predetermined time intervals, and
increase the degree of change in the deceleration of the subject vehicle in a case in which the same cutting-in vehicle is consecutively identified in the process in which the index value is repeatedly derived.

2. The vehicle control system according to claim 1, wherein the processor further executes instructions to: derive the index value on the basis of a distance between each of the surrounding vehicles and a partition line partitioning the first lane and the second lane from each other.

3. The vehicle control system according to claim 1, wherein the processor further executes instructions to: determine the degree of change in the deceleration of the subject vehicle on the basis of a relative relation between each of the surrounding vehicles and the subject vehicle.

4. The vehicle control system according to claim 1, wherein, in a case in which a point at which a lane change from the second lane to the first lane is required is present in front of the subject vehicle when referring to map information, the processor further executes instructions to: derive a larger index value as the surrounding vehicle becomes closer to the point.

5. The vehicle control system according to claim 1, wherein, in response to recognizing a plurality of surrounding vehicles, the processor further executes instructions to: identify a surrounding vehicle of which the index value is the largest among the plurality of surrounding vehicles as the cutting-in vehicle.

6. The vehicle control system according to claim 1, wherein the processor further executes instructions to: increase the degree of change in the deceleration of the subject vehicle in accordance with an increase in the index value and decrease the degree of change in the deceleration of the subject vehicle in accordance with a decrease in the index value.

7. The vehicle control system according to claim 1, wherein the processor further executes instructions to: derive the index value according to the cutting-in probability on the basis of a lateral movement of each of the surrounding vehicles.

8. A vehicle control method using an in-vehicle computer, the vehicle control method comprising:
- recognizing one or more surrounding vehicles present in a second lane different from a first lane in which a subject vehicle is present;
- in response to recognizing the one or more surrounding vehicles, deriving an index value according to a cutting-in probability for a side in front of the subject vehicle for each of the surrounding vehicles;
- identifying a surrounding vehicle of which the derived index value is equal to or larger than a threshold as a cutting-in vehicle;
- decelerating the subject vehicle in accordance with presence of the identified cutting-in vehicle;
- determining a degree of change in deceleration of the subject vehicle on the basis of the index value of the cutting-in vehicle that is a target when the subject vehicle is decelerated;
- performing a process of deriving the index value for each of the surrounding vehicles at predetermined time intervals; and
- increasing the degree of change in the deceleration of the subject vehicle in a case in which the same cutting-in vehicle is consecutively identified in the process in which the index value is repeatedly derived.

9. A non-transitory computer-readable storage medium storing a vehicle control program causing an in-vehicle computer to execute:
- recognizing one or more surrounding vehicles present in a second lane different from a first lane in which a subject vehicle is present;
- in response to recognizing the one or more surrounding vehicles, deriving an index value according to a cutting-in probability for a side in front of the subject vehicle for each of the surrounding vehicles;
- identifying a surrounding vehicle of which the derived index value is equal to or larger than a threshold as a cutting-in vehicle;
- decelerating the subject vehicle in accordance with presence of the identified cutting-in vehicle;
- determining a degree of change in deceleration of the subject vehicle on the basis of the index value of the cutting-in vehicle that is a target when the subject vehicle is decelerated;
- performing a process of deriving the index value for each of the surrounding vehicles at predetermined time intervals; and
- increasing the degree of change in the deceleration of the subject vehicle in a case in which the same cutting-in vehicle is consecutively identified in the process in which the index value is repeatedly derived.

* * * * *